Nov. 4, 1952   R. H. GRIEST ET AL   2,616,625
ELECTRICAL COMPUTING SYSTEM
Filed July 26, 1946   9 Sheets-Sheet 1

INVENTORS R. H. GRIEST
D. E. WOOLDRIDGE
BY
*p. Mackenzie*
AGENT

Nov. 4, 1952  R. H. GRIEST ET AL  2,616,625
ELECTRICAL COMPUTING SYSTEM
Filed July 26, 1946  9 Sheets-Sheet 2

INVENTORS R. H. GRIEST
D. E. WOOLDRIDGE
BY
D. MacKenzie
AGENT

Nov. 4, 1952    R. H. GRIEST ET AL    2,616,625
ELECTRICAL COMPUTING SYSTEM
Filed July 26, 1946    9 Sheets-Sheet 4

INVENTORS R. H. GRIEST
D. E. WOOLDRIDGE
BY
D. MacKenzie
AGENT

Nov. 4, 1952   R. H. GRIEST ET AL   2,616,625
ELECTRICAL COMPUTING SYSTEM
Filed July 26, 1946   9 Sheets-Sheet 5

INVENTORS R. H. GRIEST
D. E. WOOLDRIDGE
BY
D. MacKenzie
AGENT

Nov. 4, 1952

ELECTRICAL COMPUTING SYSTEM

Filed July 26, 1946

INVENTORS R. H. GRIEST
D. E. WOOLDRIDGE
BY
AGENT

Nov. 4, 1952   R. H. GRIEST ET AL   2,616,625
ELECTRICAL COMPUTING SYSTEM
Filed July 26, 1946   9 Sheets-Sheet 7

INVENTORS R. H. GRIEST
D. E. WOOLDRIDGE
BY
D. MacKenzie
AGENT

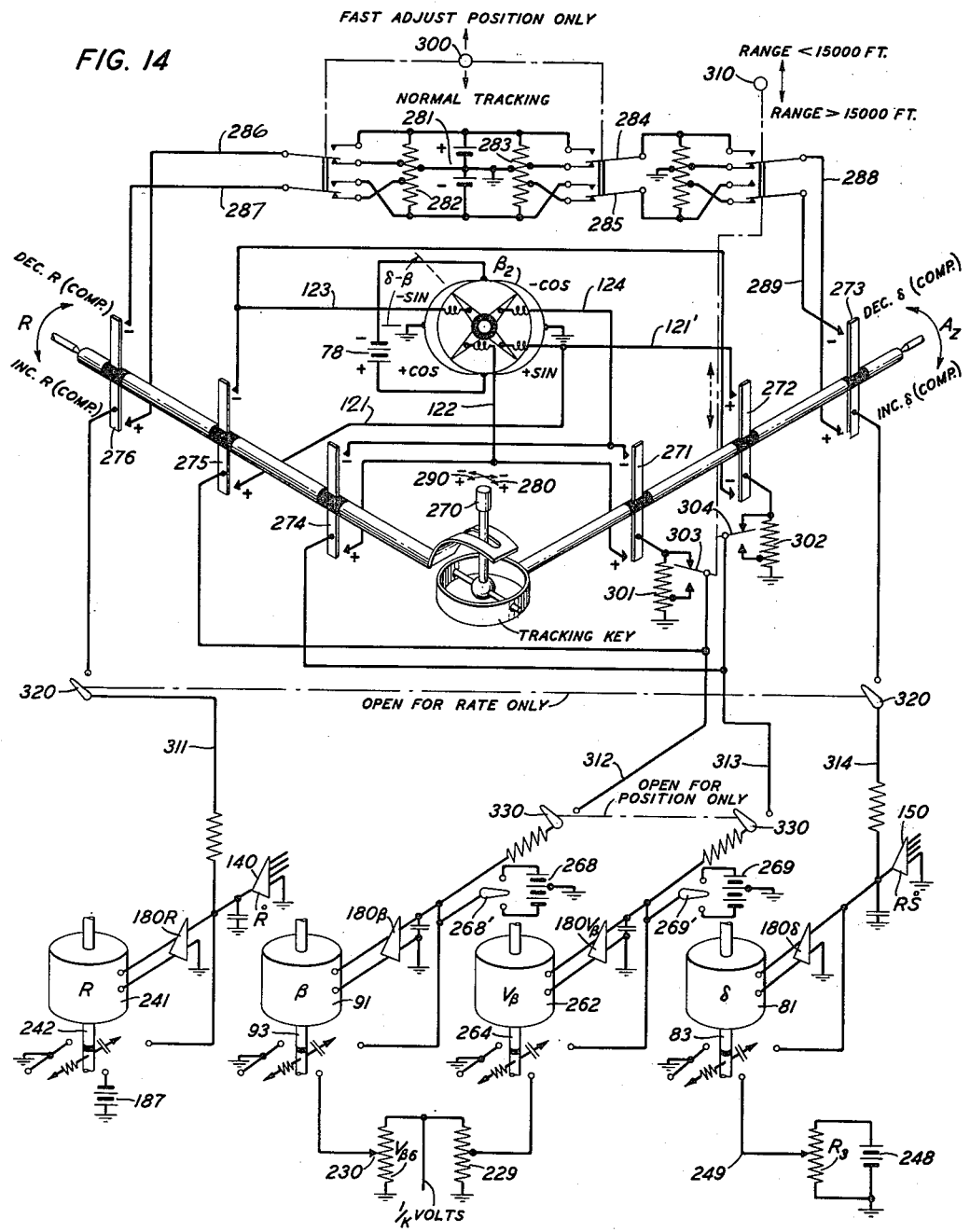

Patented Nov. 4, 1952

2,616,625

UNITED STATES PATENT OFFICE 2,616,625

ELECTRICAL COMPUTING SYSTEM

Raymond H. Griest, Summit, and Dean E. Wooldridge, Madison, N. J., assignors to Bell Telephone Laboratories, Incorporated, New York, N. Y., a corporation of New York Application July 26, 1946, Serial No. 686,486

5 Claims. (Cl. 235—61.5)

This invention relates to an improved system of apparatus for tracking a target, particularly useful in determining the direction in which a torpedo shall be released from an airplane or surface craft to strike an enemy vessel.

An object of the invention is thus to provide an improved torpedo director.

The system of the invention includes means whereby the speed and course of the target may be accurately determined in the tracking operation, and another object of the invention is to provide means for such determination.

If the target is at rest on the earth's surface, the tracking operation in determining the apparent motion of the target, actually determines the ground speed and course of the observer. These quantities are accurately determinable whatever the angle between the observer's course and the line of sight to the target observed.

It is therefore another object of the invention to provide means for determining the direction and rate of movement of an observer by reference to a fixed target unrestricted in its direction from the observer.

The ground course differs from the plane heading by the angle of drift, and the invention enables this angle to be found without the operator's having to compute the resultant of plane and wind vectors.

The tracking operator is assumed to be provided with known apparatus for continuously measuring his own airspeed and heading and to know the wind speed and direction. In the present invention these known and measured quantities are combined with an estimate of target speed and course in a computing system which continuously computes the range and bearing of the target relative to the observer. The observing apparatus with which the system of this invention cooperates affords continuous measurement of the actual target range and bearing, and in the tracking operation the computed quantities are brought to agreement with those actually observed. This is done by an adjustment involving progressive correction of the estimated speed and course of the target. In such an adjustment the observer makes simultaneous changes in computed range and rate of change thereof, or in computed bearing and rate of change of bearing, until the computed value agrees with that observed. When the tracking of the target is satisfactory, the initially unknown target vector is accurately determined and target speed and course may be read on dials.

There are known apparatus arrangements for making such changes, for example, manually adding to a range shaft through a differential gear a correcting angular displacement and simultaneously altering the speed of a motor driving the shaft; these two manipulations may be said to correct, the first, a position error, the second, a rate error. In the apparatus of the present invention, these corrections are automatically performed; the observer moves a tracking key in the direction appropriate to correct computed range or bearing, and electrical circuits including servomotors automatically revise the estimates of target speed and course, thereby making corrections in position and rate of whichever computed quantity is involved.

The ratio of any simultaneous position and rate correction, say of the computed range, may be written as $$K = \frac{\Delta \dot{R}}{\Delta R}$$

where $\Delta \dot{R}$ is the correction in rate and $\Delta R$ is the correction in position; a similar expression applies to the correction of the computed bearing. In a manual system, where position and rate are corrected separately, this ratio is dependent upon the operator's judgment. At the start of computing when rate errors are likely to be great, a relatively larger rate correction should accompany a position correction, than at a later stage in tracking when there has been brought about a closer correspondence of observed and computed quantities. That is to say, K should progressively decrease as tracking continues and from analysis there may be found the optimum variation of K with time in order that the correct target quantities shall most rapidly be reached. The automatic correcting circuit of the present invention includes means for insuring substantially the optimum time variation of K.

Three vectors are involved in the relative movement of target and attacking airplane, namely, wind speed and direction, airspeed and heading of the plane, and target speed and course. Obviously, if two of these vectors are known, the third may be estimated and its correct value found in the course of tracking the target. Another object of the invention is therefore to provide in a tracking system means for automatically correcting the estimate of an unknown vector involved in the relative movement of target and observer.

The invention will be understood from the following description of its use as an aircraft torpedo director, read with reference to the accompanying drawings in which:

Fig. 14 is a schematic diagram of the tracking control circuit of the invention.

In all cases, like elements are indicated by like numerals or letters.

Throughout there will be understood, but not shown, the conventional means for energizing the system and for supplying cathode heating and other power to the various vacuum tubes.

It will be assumed that the attacking airplane is equipped with known means for the measurement of corrected altitude and airspeed and for the representation of these quantities by electrical voltages, and that the airplane flies level and at constant speed. If the altitude of flight is small compared with the target distance, slant range and speed are not sensibly different from their horizontal components. The level flight assumed makes unnecessary a coordinate transformation to convert angles read with reference to a plane undergoing roll and pitch to the correspondent angles relative to a stable coordinate system. Provision may be made for such conversion, but is not in itself a part of the invention or needed to describe it. For the same reason there is also omitted a showing of means for controlling the tilt of the radar antenna, which will be regarded as turning only in the horizontal plane.

The airplane is assumed to be provided with the customary navigational instruments, such as directional and vertical gyros and gyro compass. Instruments of this type are described, for example, by H. M. Witherow and A. Hansen, Jr., in "Electrically driven gyroscopes for aircraft," Transactions of the American Institute of Electrical Engineers, vol. 63, page 204, April, 1944.

It is convenient to describe, first the geometry of the problem dealt with by the invention; then, briefly, the functions of a typical radar system by which target range and bearing may be observed; and finally the computing system which the invention provides.

Geometry of the attack

Figure 1:
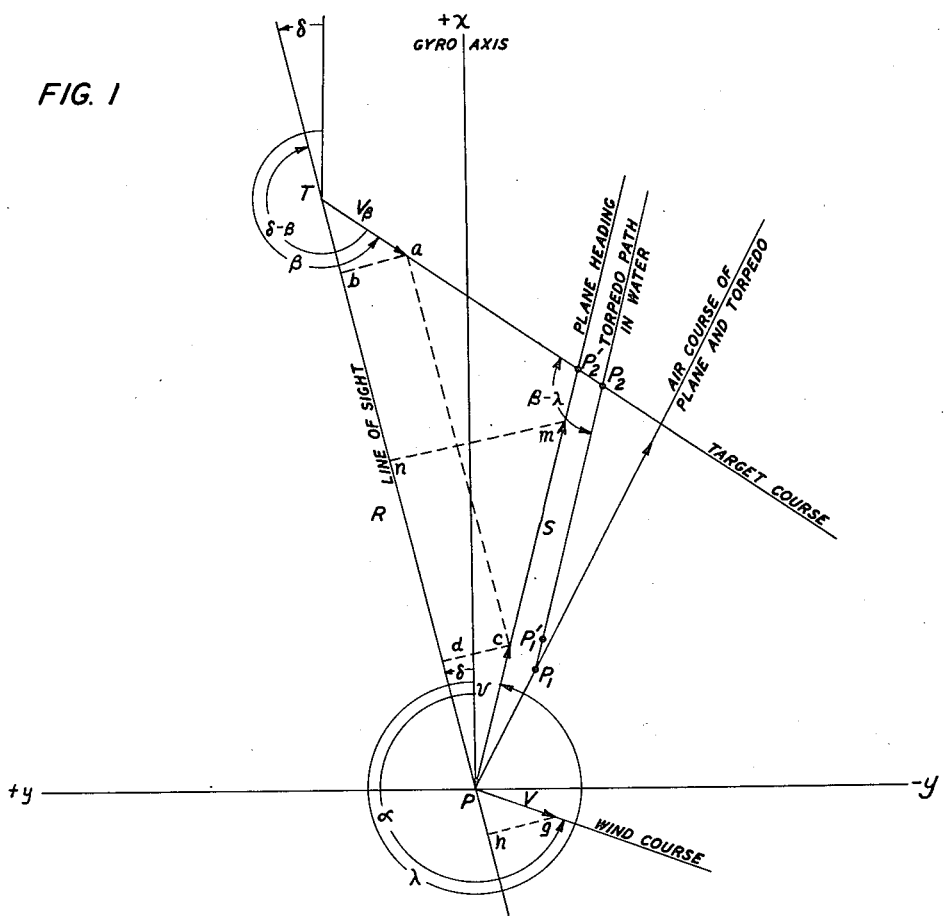
Fig. 1 is a diagram showing in horizontal projection the geometry of the attack as seen from above.

Referring to Fig. 1, a target ship is at point T on the water surface at the moment an airplane above the point P releases a torpedo to meet the target at some point, such as $P_2$, on the latter's course. It is assumed that the heading of the plane at the moment of release is appropriate to send a torpedo of velocity $v(=Pc)$ in water toward the target of velocity $V\beta=Ta$. The plane airspeed $S=Pm$ combines with the wind velocity $V=Pg$ to cause the plane to track the direction $PP_1$ with respect to the water, which is also the direction of the torpedo's motion in falling from the plane to strike the water at $P_1$. Here it is rapidly decelerated from the initial plane speed with respect to water to its own water speed $v$, and thereafter travels with the latter speed along the water course $P_1P_2$ parallel to the plane heading in air. Collision with the target ship occurs at $P_2$.

If there were no wind, or if it were possible to drop the torpedo to strike the water instantly at P with velocity $v$ and thereafter pursue the course Pcm, collision would occur at $P_2'$. From the figure it is obvious that for this to happen the component $cd$ of torpedo velocity at right angles to the line of sight PT must be equal the like component $ab$ of the target velocity. In the figure, the torpedo water speed $v$ is assumed greater than the target speed $V\beta$, corresponding to the usual case. To choose the plane heading correctly for release at a point vertically above P requires a knowledge of wind speed and direction together with a correct estimate of the target's own motion, as well as a measurement of the plane's airspeed. While airspeed may be continuously measured and wind may be known in advance, the speed and course of the target ship must be determined before the plane reaches the point at which it is desired to drop the torpedo. This determination is made possible by the tracking operation.

It is clear from general consideration of the figure that, provided the torpedo can overtake the target, the point P may be anywhere at all; it is necessary only to choose the release heading.

Consider axes $x$ and $y$ established by the usual directional gyroscope, the positive directions of these axes being shown in Fig. 1. Relative to the $x$ axis, which is that of the gyroscope and may conveniently be chosen north, positive angles are measured counter-clockwise as seen from above as follows:

$\delta$=angle from gyro axis to line of sight
$\alpha$=angle from gyro axis to wind course
$\beta$=angle from gyro axis to target course
$\lambda$=angle from gyro axis to plane heading Difference angles $\delta-\alpha$, $\delta-\beta$ and $\delta-\lambda$ are also to be measured; only the angle $\delta-\beta$ being designated on the diagram of Fig. 1. These difference angles give the directions of wind course, of target course and of plane heading, respectively, with reference to the line of sight PT. With the convention that angles are counted positive counterclockwise in Fig. 1, these difference angles, as well as others used in the invention and later referred to, are all negative.

The invention makes use of a tracking system by means of which the range $R=PT$ and the bearing angle $\delta$ of the target, together with their rates of change, $\dot R$ and $\dot\delta$, are continuously measured. In Fig. 1, the motion of the attacking plane has a component toward the target in the line of sight and a component to the right of the target perpendicular to this line. $R$ is thus decreasing at a rate equal to $-\dot R$. From the diagram, this rate is seen to be equal numerically to $Pn-Ph+Tb$, the respective components in the line of sight of the speeds $S$, $V$ and $V_\beta$. The angle $\delta$ is increasing as the plane moves to the right of the line of sight, and the product $R\dot\delta$ is numerically the tangential rate of this motion; $R\dot\delta$ is obviously given by $mn+gh-ab$, components normal to the line of sight of speeds $S$, $V$ and $V_\beta$, respectively. Recalling the definitions of the angles $\delta-\alpha$, $\delta-\beta$ and $\delta-\lambda$ of which $\delta-\beta$ is shown in Fig. 1, we see that in this figure $\sin(\delta-\lambda)$ is positive
$\sin(\delta-\alpha)$ is positive
$\sin(\delta-\beta)$ is positive
$\cos(\delta-\lambda)$ is positive
$\cos(\delta-\alpha)$ is negative
$\cos(\delta-\beta)$ is negative The components of $S$ and $V$ transverse to the line of sight PT move P to the right; the like component of $V_\beta$ similarly moves T. Counting positive these components, we find the speed of P relative to T, transverse and to the right of the line PT is made up of $mn = S \sin(\delta-\lambda)$
$gh = V \sin(\delta-\alpha)$
$-ab = -V_\beta \sin(\delta-\beta)$ Similarly, counting positive the components toward T of $S$ and $V$ and that toward P of $V_\beta$, the speed of approach of P toward T along the line of sight PT is made up of $Pn = S \cos(\delta-\lambda)$
$-Ph = V \cos(\delta-\alpha)$
$Tb = -V_\beta \cos(\delta-\beta)$ So that, formally, $$-\dot R = S \cos(\delta-\lambda) + V \cos(\delta-\alpha) - V_\beta \cos(\delta-\beta) \quad (1)$$

and $$R\dot\delta = S \sin(\delta-\lambda) + V \sin(\delta-\alpha) - V_\beta \sin(\delta-\beta) \quad (2)$$

These are the components of the plane motion toward and to the right of the target.

In the simple case of no wind and instant deceleration, the steering condition relating target and torpedo motions is $ab=cd$, that is, $$V_\beta \sin(\delta-\beta) = v \sin(\delta-\lambda) \quad (3)$$

In the practical case, allowance must be made for the time of fall $t_f$, during which the torpedo reaches the water with a velocity compounded of the plane's airspeed and the wind velocity; the time of deceleration $t_d$, during which the torpedo changes speed from the compound velocity just mentioned to its final velocity in water $v$, and the time spent at this last velocity in traveling to meet the target at $P_2$. The cross-wind velocity is understood to be too rapidly annulled in the water to require consideration, so that the deflection at $P_1$ is assumed sharply made.

There may be defined also, for later reference, the "striking angle" as that between the plane's heading and the target course, equal to 180 degrees $-(\beta-\lambda)$; the "angle of lead" as that between the line of sight and the plane's heading, equal to 360 degrees $-(\delta-\lambda)$; and the "angle on bow" of the target ship, equal to $(\delta-\beta)-180$ degrees. In Fig. 1, these are, respectively, the angles $PP_2'P_2$; $TPP_2'$; and $PTP_2$. These angles are indicated by pointers on the "navigation dial" later described.

It will be assumed that the attacking plane is equipped with a directional gyro whereby the $x$ axis is established and with means for continuously measuring the plane's airspeed. The time of torpedo fall from plane to water is known from ballistic tables, the torpedo's speed in water is known and the wind shall have been previously determined as to speed and direction toward which it blows. To find $\lambda$ defining the proper heading for release, the target motion is required.

The torpedo falls in time $t_f$ from the plane to the water, with a horizontal speed compounded of the plane airspeed and the wind velocity; call this resultant $v_f$, of which the components are $v_{fx}=S_x+V_x$, $v_{fy}=S_y+V_y$.

From the origin of coordinates at P, the torpedo then reaches $P_1$, where $$x_1 = (S_x+V_x) t_f \quad (4)$$
$$y_1 = (S_y+V_y) t_f \quad (5)$$

During deceleration in time $t_d$, the torpedo speed falls from $v_f$ to $v$ and changes direction to pursue a water path parallel to the plane heading at release. Considering the change in direction abruptly made at $P_1$ and the final speed reached at $P_1'$, we find the $x$ and $y$ components of the path interval $P_1P_1'$ to be:

$$t_d \cos\lambda\left(\frac{1}{2}[(S_x+V_x)\cos\lambda+(S_y+V_y)\sin\lambda]+\frac{1}{2}v\right) \quad (6)$$

and $$t_d \sin\lambda\left(\frac{1}{2}[(S_x+V_x)\cos\lambda+(S_y+V_y)\sin\lambda]+\frac{1}{2}v\right) \quad (7)$$

From $P_1'$ to collision at $P_2$, at time $t$ after release, the torpedo travel in water is Along $x$: $v \cos\lambda (t-t_d-t_f)$ \quad (8)
Along $y$: $v \sin\lambda (t-t_d-t_f)$ \quad (9)

The coordinates of $P_2$ are therefore ($\sin\lambda$ negative, $\cos\lambda$ positive):

$$x_2=(S_x+V_x)t_f+t_d\cos\lambda\left(\frac{1}{2}[(S_x+V_x)\cos\lambda+(S_y+V_y)\sin\lambda]+\frac{1}{2}v\right)+v\cos\lambda(t-t_d-t_f) \quad (10)$$

$$y_2=(S_y+V_y)t_f+t_d\sin\lambda\left(\frac{1}{2}[(S_x+V_x)\cos\lambda+(S_y+V_y)\sin\lambda]+\frac{1}{2}v\right)+v\sin\lambda(t-t_d-t_f) \quad (11)$$

The target ship moves in time $t$ from T to $P_2$. The coordinates of T are:

$$x_T = R \cos \delta$$

and $$y_T = R \sin \delta$$

If the speed of the target ship is $V_\beta$, its $x$ and $y$ components are, respectively, $V_\beta \cos \beta$ and $V_\beta \sin \beta$, both of which are negative in Fig. 1.

Therefore, the coordinates of $P_2$ are $$x_2 = R \cos \delta + V_\beta \cos \beta \cdot t \qquad (12)$$

and $$y_2 = R \sin \delta + V_\beta \sin \beta \cdot t \qquad (13)$$

Since $S_x = S \cos \lambda$ and $S_y = S \sin \lambda$, while $V_x = V \cos \alpha$ and $V_y = V \sin \alpha$, Equations 10 and 11 may be rewritten and combined with Equations 12 and 13 to eliminate $t$. On simplifying, there is obtained the steering equation:

$$RV_\beta \sin(\delta - \beta) - Rv \sin(\delta - \lambda) + (S-v)\left(t_f + \frac{1}{2}t_d\right)V_\beta \sin(\beta - \lambda) +$$

$$V\left(t_f + \frac{1}{4}t_d\right)V_\beta \sin(\beta - \alpha) + Vvt_f \sin(\alpha - \lambda) + \frac{t_d V_\beta V}{4} \cdot \sin(\alpha + \beta - 2\lambda) = 0 \qquad (14)$$

In practice, the last term is neglected, since it is usually small and negligible in comparison with the others.

Of the quantities in Equation 14, R and $\delta$ and their time rates of change are observed; $t_f$, $t_d$ and $v$ are known; S is measured continuously; and V and $\lambda$ are determined in advance, while $V_\beta$ and $\beta$ are assumed and progressively corrected in tracking the target prior to release. By such tracking correct values of $V_\beta$ and $\beta$ are obtained, after which at any time a value of $\lambda$ may be set up to satisfy Equation 14. It will be noted that there is no unique release point; for any value of R there is a value of $\lambda$ which will insure a torpedo hit at some point $P_2$ provided the torpedo can travel in water faster than the target, which is normally the case. Even if the target is faster, there is still an infinity of proper release points which will result in hits.

*Target observing system*

Figure 2:
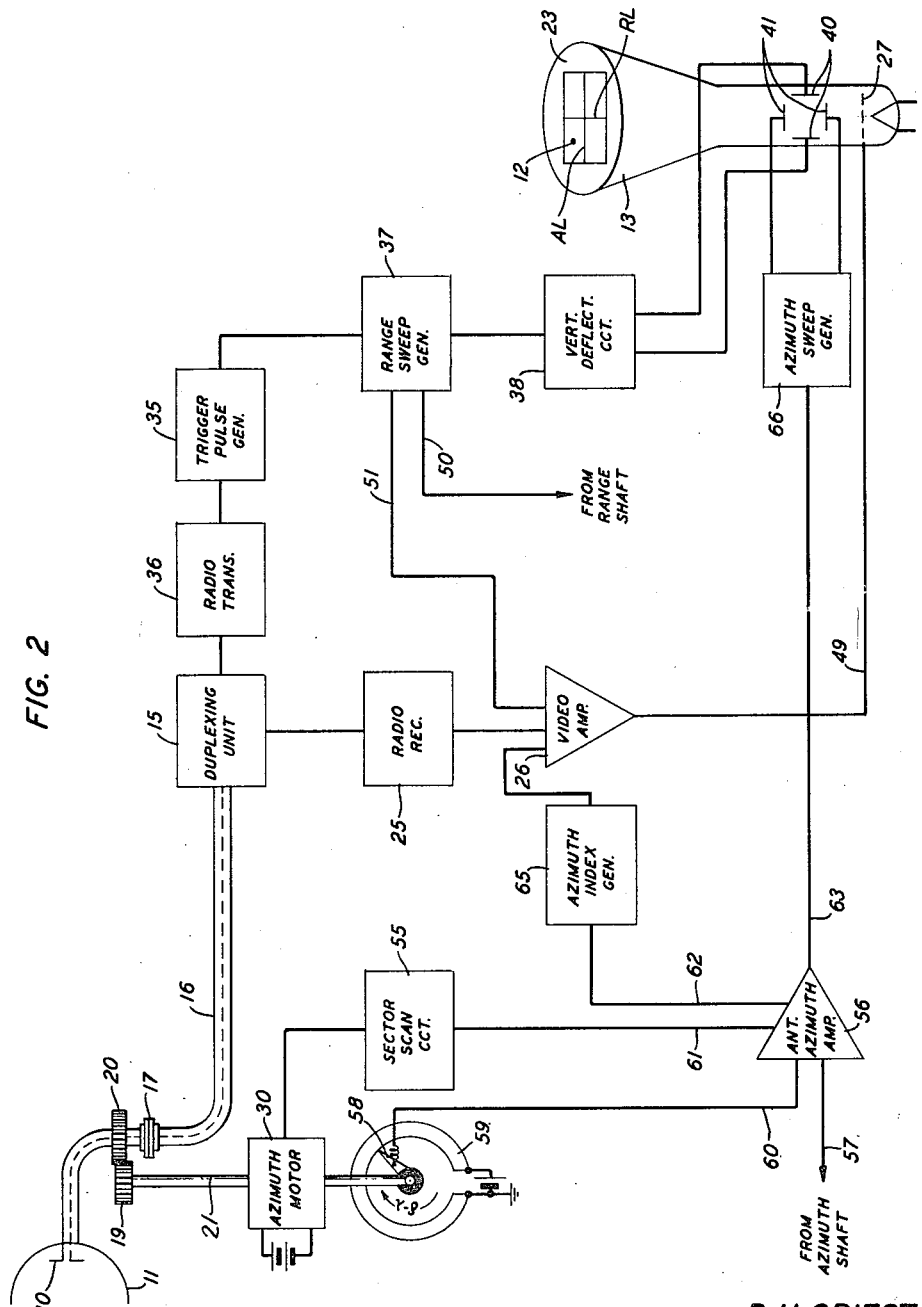
Fig. 2 is a schematic of a known type of electrical locating and ranging system utilized by the apparatus of the invention.

Fig. 2 schematically shows a radar system of known type which may be installed in the plane and used in tracking the target. Inasmuch as such a system is not itself a part of the present invention, the apparatus of Fig. 2 will be described only functionally.

Antenna 10, at the focus of reflector 11, is highly directive and emits recurrent pulses of radio frequency energy, each of which is in part returned when intercepted by the target. The returned echo pulse appears as spot 12 on screen 23 of oscilloscope 13.

Trigger pulse generator 35 produces recurrent sharp voltage pulses which are supplied to radio transmitter 36, wherein they give rise to radio frequency pulses fed through duplexing unit 15 over a coaxial cable or wave guide 16 to antenna 10. Cable 16 includes a rotary joint 17 permitting horizontal rotation of the antenna. Such rotation is effected through gears 19, 20, gear 19 being carried as shown on shaft 21 of azimuth motor 30, while gear 20 is is mounted on the part of cable 16 above joint 17. Under the assumed circumstances of operation, vertical rotation of antenna 10 is not required.

Each echo returned from the target is focussed by reflector 11 on antenna 10 and thence passes through duplexing unit 15 to radio receiver 25, in which it is suitably transformed to enter video amplifier 26. Duplexing unit 15 is of known character and admits to receiver 25 only the low energy returned pulses, excluding from this path the outgoing high energy pulses from transmitter 36. The transformed echo emerges from amplifier 26 as a positive voltage pulse over conductor 49 to intensity grid 27 of oscilloscope 13 and produces brightening of the cathode ray trace to show as spot 12.

Simultaneously with emission of a radar pulse from antenna 10, the voltage pulses from generator 35 are supplied to range sweep generator 37, there producing a rising sweep voltage applied through vertical deflection circuit 38 to vertical deflecting plates 40 of oscilloscope 13. There results an upward sweep of the cathode ray trace, starting with each recurrence of a radar emission, form the bottom of screen 23, a position to which it is biased (by means not shown) in the absence of a vertical sweep voltage. Video amplifier 26 is designed to blank the cathode ray trace during its return and during its upward movement except when grid 27 receives a brightening voltage pulse due to a returned echo or to an azimuth or a range indication from amplifier 26. The vertical position of spot 12 thus corresponds to the target range R. The duration of each sweep voltage is made longer than the time of echo return from the most distant target it is desired to observe, and the recurrence interval of the radar emission from antenna 10 is somewhat longer still.

Via conductor 50 a varying voltage, decreasing uniformly with time, is introduced from a range circuit later described. Once in each recurrence the sweep voltage reaches equality with the voltage on conductor 50, and this equality comes progressively earlier in successive sweeps. At each moment of equality, a sharp voltage pulse passes over conductor 51 to amplifier 26 which thereupon via conductor 49 furnishes an indicating brightening impulse to grid 27. By adjustment of the voltage on conductor 50 and of its rate of decrease, the indicating pulse is made to occur continuously in time coincidence with the returned echo. The rate of decrease of the voltage on conductor 50 is thus proportional to the relative velocity in the line of sight of plane and target.

Azimuth motor 30 is controlled, through sector scan circuit 55, by the output voltage of antenna azimuth amplifier 56 to cause antenna 10 to sweep repetitively over a limited sector the center of which is determined by the input voltage over conductor 57 to amplifier 56.

Brush 58, turning with and insulated from an extension of shaft 21, sweeps over linear potentiometer 59 fixed in the airplane concentrically with shaft 21. The voltage selected by brush 58 is thus representative of the facing, relative to the plane's fore and aft axis, of antenna 10, and is via conductor 60 supplied as another input voltage to amplifier 56 of opposite sign to the voltage over conductor 57. If normally the center of the sector swept by antenna 10 is to be directly forward of the plane, the voltage on conductor 57 is adjusted to cancel the voltage from brush 58 in the position corresponding to this antenna facing. Sector scan circuit 55 drives motor 30 through a sector of which the limits are fixed by a prescribed voltage difference, of either sign, between the voltage on conductor 60 and that on conductor 57. The choice of the latter voltage thus determines the center of the sector swept by the antenna. Output voltages from amplifier 56, via conductors 61, 62 and 63, are supplied respectively to circuit 55, to azimuth index generator 65 and to azimuth sweep generator 66. Conductor 61, as described, activates circuit 55. Conductor 62 supplies, at the moment of equality of voltages on conductor 57 and 60, a sharp voltage pulse to azimuth index generator 65; this pulse passes to video amplifier 26 and thence as a trace brightening voltage to grid 27.

Conductor 63 supplies to azimuth sweep generator 66 a voltage varying with the net input voltage to amplifier 56. Generator 66 provides a horizontal sweep voltage to horizontal deflecting plates 41 of oscilloscope 13 which causes the cathode ray trace to sweep repetitively, back and forth across screen 23 in accordance with the repetitive sector sweep of antenna 10.

The brightening voltage pulse, occurring at the center of the antenna sector, lasts for the duration of an upward sweep of the cathode ray trace, which accordingly appears as a vertical bright line AL centered horizontally on screen 23. The brightenings due to pulses corresponding to equalities of voltage on conductor 50 and rising sweep voltage in generator 37 fuse into a horizontal range line RL on the oscilloscope screen. Both actual and computed target range are continually diminishing under the conditions illustrated in Fig. 1, wherefore the target echo spot and the range line RL are continually approaching the bottom of the screen. The object of the tracking procedure later described is to maintain the echo spot at the intersection of lines AL and RL. Line AL is horizontally centered on the screen whatever may be the angular position, with respect to the plane's fore and aft axis, of the center of the antenna sector.

As a result, if the voltages on conductors 50 and 57 have been chosen to make range line RL and azimuth line AL both intersect target echo spot 12, that spot appears at the intersection of these lines on screen 23 and will follow that intersection provided the voltages on conductors 50 and 57 are continuously varied to represent respectively range and bearing of the target. Voltage for conductor 50 is obtained from a potentiometer brush on a range shaft; voltage for conductor 57, from a like brush on an azimuth shaft.

Figure 7A:
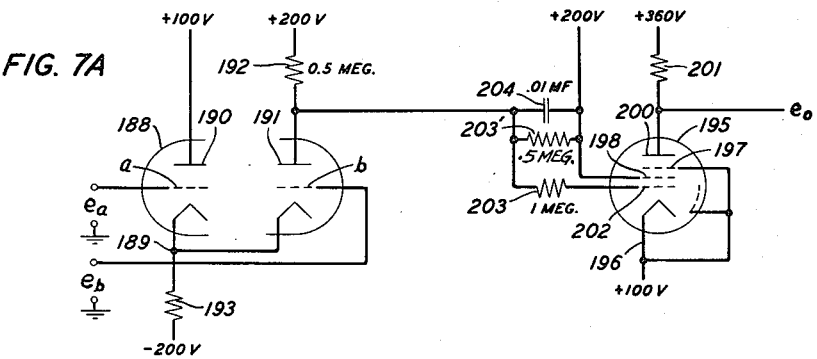
Figs. 7A and 7B are circuit diagrams of certain amplifiers used in the circuits of Figs. 5 and 6.

Sector scan circuit 55 may be such as is disclosed and claimed in the copending application of A. R. Kolding, "Directive Antenna Control System," Serial No. 546,828, filed July 27, 1944 and assigned to the same assignee as the present invention. Amplifier 56 may be of the type described below in connection with Fig. 7A.

*Potentiometer system*

Figure 3:
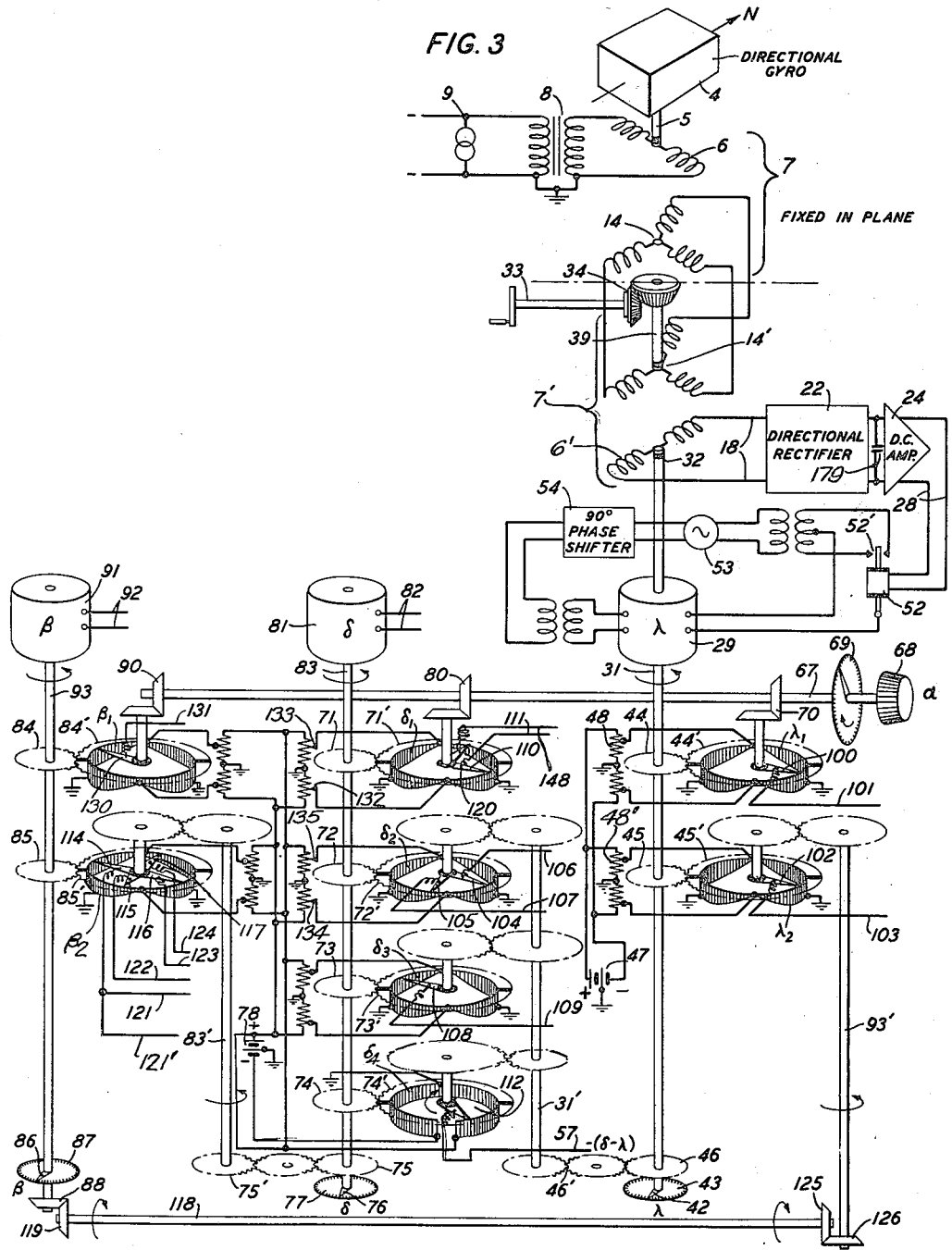
Fig. 3 is an illustrative showing of the system of inter-related potentiometers whereby are obtained the various functions of the angular differences among the directions indicated in Fig. 1 including a showing of the means whereby the airplane heading is set into the potentiometer system.

Referring now to Fig. 3, directional gyro 4 of known type defines a constant horizontal direction which may be chosen north and south, as indicated, in preliminary adjustment. At any desired moment, gyro 4 may be clutched (by conventional means, not shown) to control shaft 5 attached to which is rotor coil 6 of a "telegon" transmitter 7. Coil 6 is supplied with alternating current of suitable frequency through transformer 8 from source 9, derived by conventional means from the customary power supply with which the airplane is provided. Stator coils 14 of transmitter 7 are connected in standard manner to stator coils 15' of "telegon" receiver 7', provided with rotor coil 6'. Unless rotor coil 6' stands electrically at right angles to coil 6, an alternating voltage is generated in coil 6' of the frequency of source 9 and of amplitude dependent upon the electrical position of coil 6' relative to coil 6. By conductors 18, coil 6' is connected to the input of directional rectifier 22 wherein the alternating current flowing in coil 6' is rectified and supplied to direct current amplifier 24 which may be of any known design.

Rectifier 22 comprises a vacuum tube to the input circuit of which coils 6' supply an alternating voltage of the frequency of source 9 but of amplitude dependent upon the positions of shafts 5, 32 and 39. Anode voltage for this tube is also derived from source 9 but is of fixed amplitude and phase. The latter is either the same as or opposite to that of the input voltage, depending upon the shaft positions. The output of rectifier 22 is therefore a pulsating direct current of amplitude and polarity dependent upon the space relationships of coils 6, 14, 14' and 6'. The rectifier circuit is not shown in detail, being on adaptation readily made of the invention disclosed in United States Patent 1,620,204, March 8, 1927, to R. A. Heising.

Conductors 28 supply the output voltage of amplifier 24 to the winding of polar relay 52 having an armature 52' normally biased to a central position but movable therefrom in a direction dependent on the sense of current flow in the relay winding. The deflection of armature 52' controls the phase in which alternating current from a suitable source 53, which may be the same as source 9, is supplied to one phase winding of two-phase motor 29, the other phase winding of which is supplied from source 53 through 90-degree phase shifting network 54. When the output voltage of amplifier 24 is other than zero, armature 52' is operated in a direction fixed by the polarity of that voltage and motor 29 correspondingly drives shaft 31.

Figure 10:
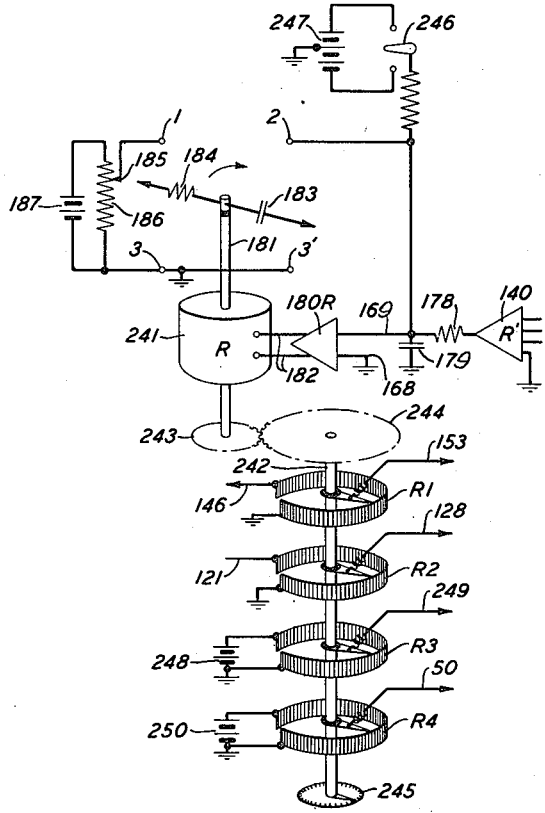
Fig. 10 is a schematic diagram of a target range servo system.
Figure 11:
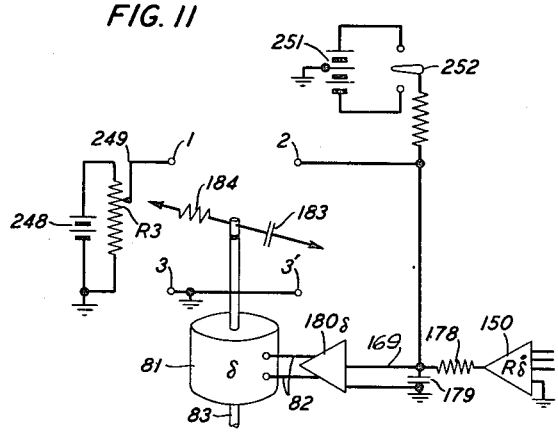
Fig. 11 is a schematic diagram of a target bearing servo system.
Figure 12:
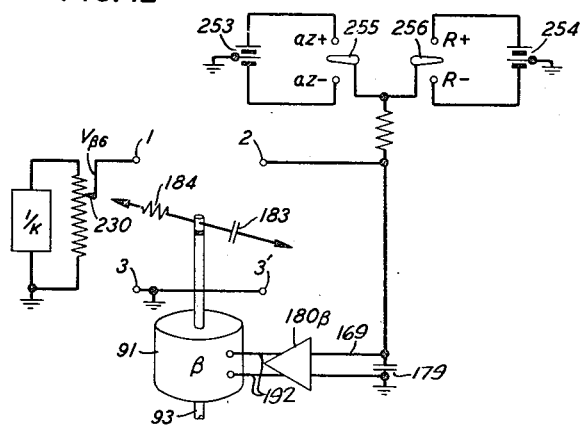
Fig. 12 is a schematic diagram of a target course servo system.

Motors 81 and 91 in Fig. 3, and other motors shown in circuits later described, are like motor 29 and are controlled in the same fashion by their respective control amplifiers. In the figures which follow, the control amplifier is for the sake of compactness shown directly connected to the motor it controls, but in each case the complete circuit is like that just described between rectifier 22 and motor 29. In Fig. 3, control amplifier 24, supplied from rectifier 22 with a unidirectional voltage varying with λ in amplitude and polarity, controls through relay 52 and armature 52' the application of source 53 to drive λ motor 29. For δ motor 81 and β motor 91, conductors 82 and 92 are understood to represent duplicates of the elements shown between amplifier 24 and λ motor 29. In Figs. 10, 11 and 12, the conductor pairs 182, 82 and 92 represent like elements between amplifiers 180R, 180δ and 180β and motors 241, 81 and 91, respectively; in Figs. 13 and 14 designating numerals for such conductor pairs are omitted. Condenser 179 is referred to in describing Fig. 6.

Figure 6:
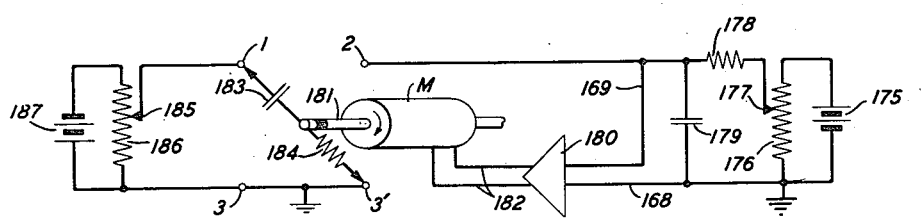
Fig. 6 is a circuit diagram showing the motor speed control used with the $\beta$ and $\delta$ motors of Fig. 3.

For simplicity, Fig. 3 omits the showing of the motor control circuit of Fig. 6 between shaft 31 and the input terminals of amplifier 24 (following the output terminals of unidirectional voltage source 22). The omitted elements are described in connection with Fig. 6.

Coils 14 are fixedly mounted in the airplane and hence turn with change of heading relatively to coil 6, while coils 14' and 6' may be located at any convenient point. As later mentioned, the orientation of coils 14' is under the operator's control.

Shaft 31 of motor 29 has an upward extension 32 by which coil 6' may be rotated relatively to stator coils 14' of receiver 7'. The connection of conductors 28 to the winding of relay 52 is so made that the rotation of shaft 31 and therewith of coil 6', is in such a direction as to drive that coil to the no-voltage position relative to coil 6 and so to shaft 5. In this position, a pointer 42 carried on the extremity of shaft 31 reads on dial 43, the compass direction defined by the horizontal axis of directional gyro 4.

If the axis of gyro 4 is north and south, pointer 42 is by preliminary adjustment set to 0 on dial 43 and continues there unless the tracking observer intervenes to make the reading on dial 43 indicate the airplane's heading $\lambda$, defined in the description of Fig. 1 to be the angle, counterclockwise from above, between the gyro axis and the airplane heading. Learning from the airplane pilot the plane's heading, the observer intervenes through manual operation of shaft 33 through gears 34 to turn shaft 39 by which is positioned stator coil 14'. Motor 29 therewith turns, and continues to turn until the tracking operator's intervention ceases when pointer 42 reads on dial 43 the angle $\lambda$. This setting of shaft 31 is made when the tracking operation commences. Thereafter shaft 39 is undisturbed and rotation of shaft 5 relative to the airplane on change in airplane heading is automatically followed by rotation of shaft 31, the angular position of which thus continuously represents the angle $\lambda$.

On shaft 31 are mounted gears 44, 45 and 46. Gears 44 and 45 engage respectively gears 44' and 45', each of which carries a circular potentiometer card having a sinusoidal winding, designated respectively as $\lambda_1$ and $\lambda_2$. Each of these potentiometers is supplied with voltage from a direct current source, shown as battery 47 shunted by potentiometers 48, 48', each having a grounded mid-point, the mid-point of battery 47 being grounded. Source 47 is connected to potentiometers $\lambda_1$ and $\lambda_2$ at the ends of the diameters thereof joining the points of minimum resistance per turn, while at the ends of the diameters at right angles to these points the potentiometer windings are grounded.

Preliminary adjustment of the engagement of gears 44 and 44' and gears 45 and 45' is so made that the diameters of battery connection to potentiometers $\lambda_1$ and $\lambda_2$ are parallel, and conveniently parallel also to pointer 42 when that pointer reads 0 on dial 43. Thereafter rotation of shaft 31 to follow the angle $\lambda$ causes the cards of potentiometers $\lambda_1$ and $\lambda_2$ themselves to follow this angle. It is to be understood that battery and ground connections to these potentiometers, and to others presently to be identified in Fig. 3, are made through suitable slip rings.

Gear 46 transmits the $\lambda$ motion of shaft 31 as will be later described.

As shaft 31 turns, potentiometers $\lambda_1$ and $\lambda_2$ turn therewith and a brush may be positioned on either $\lambda_1$ or $\lambda_2$ to derive a voltage which is a trigonometric function of the angular difference in the positions of the brush and of the battery diameter of the potentiometer card. By "battery diameter" is meant that diameter of the card across which is impressed the voltage from source 47. For both brush and battery diameter, the zero position is that electrically parallel to the axis of directional gyro 4.

For example, it is desired to derive from potentiometer $\lambda_1$ a voltage proportional to sin $(\alpha-\lambda)$, a quantity used in the steering computation, Equation 14. Shaft 67, manually controlled by knob 68, shows on dial 69 the angle $\alpha$, defined in describing Fig. 1 as the direction towards which the wind blows, counterclockwise from the north. Through gears 70 by hand adjustment of knob 68, shaft 67 positions to the angle $\alpha$ on the potentiometer $\lambda_1$ brush 100, from which via conductor 101 there is obtained a voltage proportional to sin $(\alpha-\lambda)$. It is understood that brush 100, and other brushes later to be mentioned, are insulated from their respective positioning shafts. The angle $(\alpha-\lambda)$ is described from the right-hand ground to the lower battery connection in Fig. 3. In addition to gear 70, shaft 67 carries gears 80 and 90 whereby brushes 110, 120 and 130 are also positioned to the angles $\alpha$, $\alpha-90°$ and $\alpha-180°$, respectively.

Motors 81 and 91, each similar to motor 29, are driven by electrical currents supplied over conductors 82 and 92 to rotate shafts 83 and 93, respectively, to angular positions representative of the target bearing $\delta$ and the target course $\beta$, respectively. The position and speed control of motors 81 and 91 will be fully described later; shafts 83 and 93 will for the present be assumed positioned, as will also shaft 31, according to a particular set of values of angles $\delta$, $\beta$ and $\lambda$, respectively, the control of shaft 31 having been described above.

Shaft 83 carries gears 71, 72, 73, 74 and 75, and pointer 76 reading the angle $\delta$ on dial 77. Gears 71 to 74 respectively engage gears 71' to 74' to position sinusoidal potentiometers $\delta_1$, $\delta_2$ and $\delta_3$ and linear potentiometer $\delta_4$. These potentiometers are supplied with voltage from a direct current source such as battery 78 in the same fashion as potentiometers $\lambda_1$ and $\lambda_2$ are supplied from source 47; these voltage sources may be derived by suitable means (not shown) from the airplane power supply and of course may be consolidated into a single source.

In the same manner shaft 93 positions potentiometer $\beta_1$ through gears 84—84' and potentiometer $\beta_2$ through gears 85—85' carrying also pointer 86 to read the angle $\beta$ on dial 87. Shaft 93 ends at gear 88. Potentiometers $\beta_1$ and $\beta_2$ are both sinusoidal potentiometers, supplied from source 78. Gears 75 and 88 serve to transmit the $\delta$ and $\beta$ shaft positions, as does gear 46 to transmit the $\lambda$ shaft position.

In the same way as explained in connection with potentiometers $\lambda_1$ and $\lambda_2$, the $\delta$ and $\beta$ potentiometers are so positioned by their controlling shafts that their respective battery diameters make with an arbitrary reference line the angles $\delta$ and $\beta$, respectively. The reference line for all $\lambda$, $\delta$ and $\beta$ potentiometers is conveniently the same. Shaft 67, set by hand through knob 68 to the angle $\alpha$, positions brushes 110 and 120 on potentiometer $\delta_1$ and brush 130 on potentiometer $\beta_1$. Via conductors 111 and 148 there are available voltages proportional to sin $(\delta-\alpha)$ and cos $(\delta-\alpha)$ from brushes 110 and 120, respectively, while via conductor 131 may be taken a voltage proportional to sin $(\beta-\alpha)$.

The difference angles $(\alpha-\lambda)$, $(\delta-\alpha)$, and $(\beta-\alpha)$ are obtained by the hand setting of shaft 67 to position brushes 100, 110, 120 and 130 appropriately with respect to the reference line independently of the settings of $\lambda$, $\delta$ and $\beta$ potentiometers. These potentiometers are set by their respective motor drive shafts to make with the reference line the respectively appropriate angles. The difference angles $(\beta-\lambda)$, $(\delta-\lambda)$ and $(\delta-\beta)$ are obtained by positioning appropriate brushes.

The $\lambda$ motion is transmitted from shaft 31 through gear 46 and cooperating gears 46' to shaft 31', which through gears as shown positions brushes 104, 105, 108 and 112. The $\delta$ motion is transmitted from shaft 83 through gear 75 and cooperating gears 75' to shaft 83' which as shown carries gears to position brushes 114–117 inclusive. In like manner, shaft 93 transmits the $\beta$ motion to shaft 93', through intermediate shaft 118 carrying gears 119 and 125 which engage respectively gear 88 on shaft 93 and gear 126 on shaft 93'.

The table below sets forth the angular settings of the various brushes in the several potentiometers consistently with the geometry of Fig. 1, assumed to represent one solution of the attack:

| Potentiometer | Brush | Angle | Voltage | Conductor |
|---|---|---|---|---|
| $\lambda_1$ | 100 | $\alpha$ | $\sin(\alpha-\lambda)$ | 101 |
| $\lambda_1$ | 102 | $\beta$ | $\sin(\beta-\lambda)$ | 103 |
| $\delta_1$ | 110 | $\alpha$ | $\sin(\delta-\alpha)$ | 111 |
| $\delta_1$ | 120 | $\alpha-90°$ | $\cos(\delta-\alpha)$ | 148 |
| $\delta_1$ | 104 | $\lambda$ | $\sin(\delta-\lambda)$ | 106 |
| $\delta_1$ | 105 | $\lambda+90°$ | $\cos(\delta-\lambda)$ | 107 |
| $\delta_1$ | 108 | $\lambda-180°$ | $-\sin(\delta-\lambda)$ | 109 |
| $\delta_4$ | 112 | $\lambda$ | $-(\delta-\lambda)$ | 57 |
| $\beta_1$ | 130 | $\alpha-180°$ | $\sin(\beta-\alpha)$ | 131 |
| $\beta_2$ | 114 | $\delta-180°$ | $\sin(\delta-\beta)$ | 121 |
| $\beta_2$ | 115 | $\delta+90°$ | $\cos(\delta-\beta)$ | 122 |
| $\beta_2$ | 116 | $\delta$ | $-\sin(\delta-\beta)$ | 123 |
| $\beta_2$ | 117 | $\delta-90°$ | $-\cos(\delta-\beta)$ | 124 |

Conductor 121 has a branch 121', used in the circuit of Fig. 14.

In the cases of the $\lambda$ and $\beta$ potentiometers, the angle is counted as the brush position—the potentiometer position; for the $\delta$ potentiometer, it is more convenient so to show these that the angle considered is that of potentiometer-brush. For potentiometer $\delta_4$, the gearing from shaft 31 is arranged to provide an angular reduction of 2 to 1, in order that a single circular potentiometer with linear winding shall suffice to represent the entire range of the angle $\delta-\lambda$.

It is to be understood that the arrangement shown in Fig. 3 is illustrative only. Many other configurations may be designed for providing the same interrelations of potentiometers and brushes to make available the desired voltages.

The trigonometric functions listed in the table above are combined to form, some the right-hand members of tracking Equations 1 and 2, some the left-hand members of steering Equation 14 omitting the last term thereof. It will be observed that in the case of each potentiometer of Fig. 3 the voltage source is shunted by a resistance voltage dividing circuit like 48 across battery 47, with grounded mid-point and taps supplying proper equal positive and negative potentials to the potentiometer. All potentiometers of Fig. 3, except $\delta_1$ and $\delta_2$ have their battery diameters connected to fixed taps in such circuits which are directly in shunt with the voltage source. Potentiometers $\delta_1$ and $\delta_2$ are connected at the ends of their battery diameter to adjustable taps on the shunt resistors, each tap is adjusted to have a potential with respect to ground which is proportional to a quantity which is determined by the flight conditions assumed: for $\delta_1$, this quantity is the wind speed V; for $\delta_2$, the plane airspeed S. It is convenient to designate these four taps by specific numerals; 132 and 133 for $+V$ and $-V$ respectively on $\delta_1$; 134 and 135 for $+S$ and $-S$ respectively on $\delta_2$.

Figure 4:
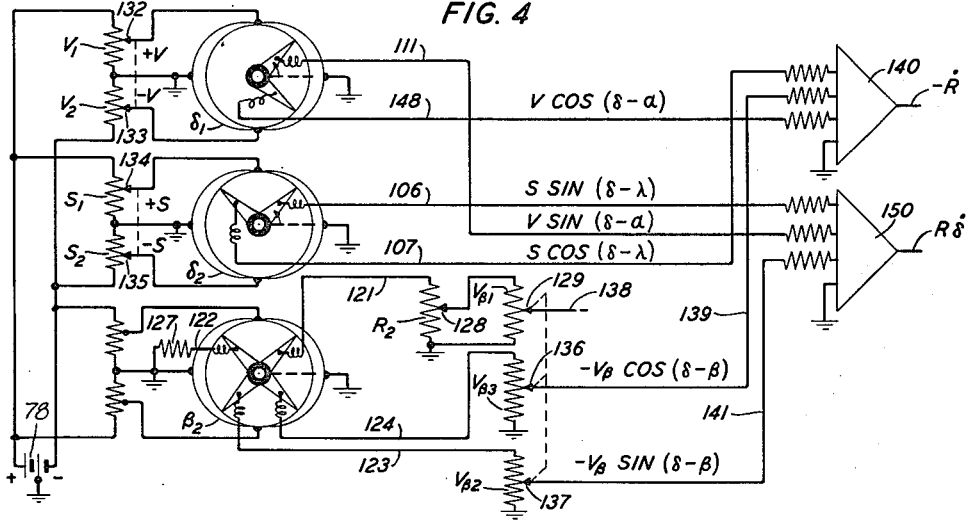
Fig. 4 is a circuit diagram showing the use of the functions derived from the potentiometer system of Fig. 3 to obtain the components in the line of sight and transverse thereto of the relative speed of target and attacking airplane.
Figure 5:
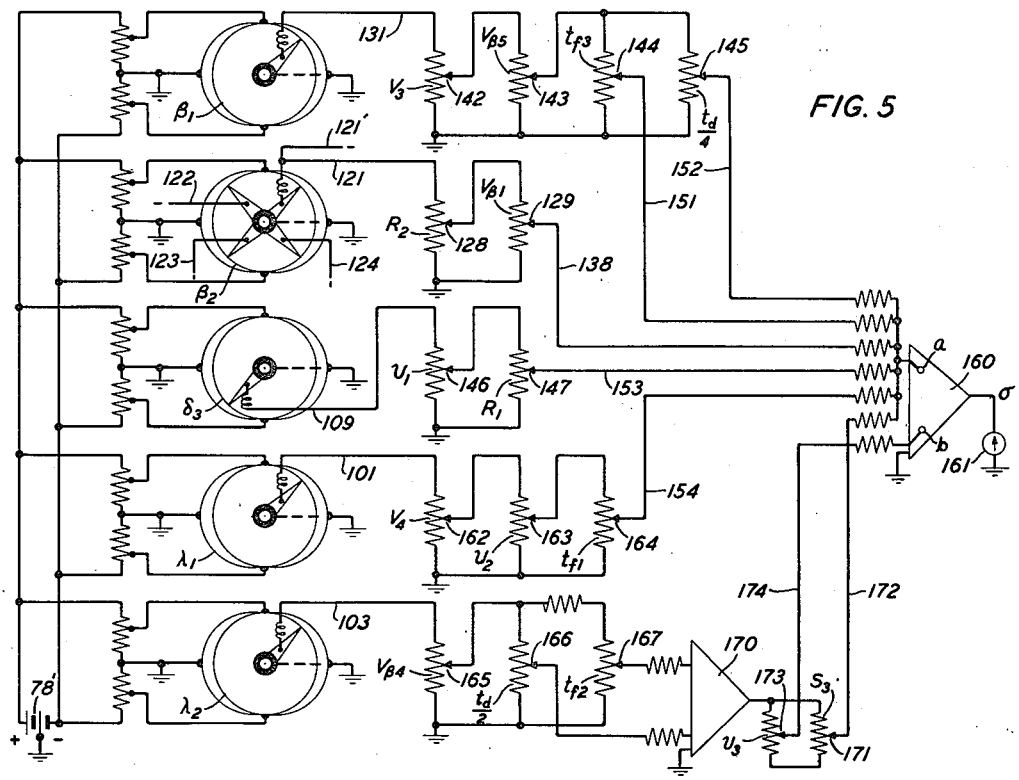
Fig. 5 is a circuit diagram showing the use of the functions derived by the system of Fig. 3 to solve the problem of the attack.

Assuming that the range and azimuth shaft positions correspond, at some instant in the attack, to correct tracking of the target, we find in Fig. 4 the circuit arrangement which is concerned in tracking Equations 1 and 2; in Fig. 5, that concerned in steering Equation 14.

Referring now to Fig. 4, handset potentiometer taps 132 and 133 (as shown in Fig. 9-A) apply between ground and the ends of the battery diameter of potentiometer $\delta_1$ fractions $+V$ and $-V$ of the voltage of source 78. Accordingly, conductors 111 and 148 derive voltages proportional to $V\sin(\delta-\alpha)$ and $V\cos(\delta-\alpha)$ respectively. Taps 134 and 135 (as in Fig. 9-B) impress on potentiometer $\delta_2$ at the ends of its battery diameter the fractional voltages $+S$ and $-S$, respectively. Conductor 106 provides voltage $S\sin(\delta-\lambda)$; conductor 107, voltage $S\cos(\delta-\lambda)$.

The fractionations of the sine and cosine voltages from potentiometers $\beta_2$ are made by brushes traversing potentiometers wound upon flat cards which are then formed around circular supports. For convenience, in Figs. 4 and 5 these circular cards are represented as flat.

Of the four voltages obtainable from potentiometer $\beta_2$ no use is made in Equations 1, 2 and 14 of that via conductor 122, $\cos(\delta-\beta)$. This brush is therefore connected to ground through resistor 127 to balance the impedance facing the four brushes.

Conductor 121, $\sin(\delta-\beta)$, is grounded through potentiometer $R_2$ on which tap 128 selects a fractional voltage with respect to ground proportional to target range. This is further fractionated by tap 129 on potentiometer $V_\beta$, proportionally to the target speed, and conductor 138 supplies the voltage $RV_\beta\sin(\delta-\beta)$ as one input to amplifier 160 of Fig. 5. The negative $\cos(\delta-\beta)$ and $\sin(\delta-\beta)$ voltages from conductors 124 and 123, respectively are each fractionated (by taps 136 and 137 on potentiometers $V_{\beta 2}$ and $V_{\beta 3}$) proportionally to target speed. Taps 128, 129, 136 and 137 are, as later explained, automatically set by the tracking circuit of the invention. There are thus provided by conductors 139 and 141 voltages respectively proportional to $-V_\beta\cos(\delta-\beta)$ and $-V_\beta\sin(\delta-\beta)$.

In series with suitable input resistors, voltages $V\cos(\delta-\alpha)$, $S\cos(\delta-\lambda)$ and $-V_\beta\cos(\delta-\beta)$ are supplied to summing amplifier 140 of which the output voltage is accordingly proportional to $-R$, the component in the line of sight of the relative plane-to-target speed: Equation 1.

In the same manner, voltages $V\sin(\delta-\alpha)$, $S\sin(\delta-\lambda)$ and $-V_\beta\sin(\delta-\beta)$ are summed by amplifier 150 of which the output voltage represents the transverse component of plane-to-target speed: Equation 2.

Voltmeters, not shown, may be connected across the outputs of amplifiers 140 and 150, and calibrated to read the corresponding speed components $R$ and $R\delta$.

The wind velocity V is assumed constant and known beforehand. Plane airspeed is continuously measured and may by known apparatus be corrected for atmospheric conditions. The airspeed so corrected is S.

Fig. 5 is a schematic diagram of the circuit supplying to amplifier 160 the input voltages which are summed according to steering Equation 14. Assuming flight at constant altitude and airspeed, the only quantity in Equation 14 which may be controlled in the attack is the plane heading λ. For any point in the airplane's flight there is a value of λ appropriate for launching the torpedo and when this is the heading, Equation 14 is satisfied as soon as the tracking operation correct values have been found for target course and speed. The output circuit of amplifier 160 includes meter 161 which reads zero when $V_\beta$ and β are correctly estimated and λ is the correct heading. Meter 161 may be so connected as to read positively or negatively according as λ is too great or too small. Such a reading is an indication to the observer that the existing heading must be changed until meter 161 reads zero.

The potentiometers of Fig. 3, concerned in the steering circuit, are repeated in Fig. 5. They include potentiometer $\beta_2$ used also in the circuit of Fig. 4. For convenience, voltage sources 47 and 78 are consolidated in Fig. 5 as battery 78', connected directly across the battery diameters of potentiometers $\beta_1$, $\beta_2$, $\delta_3$, $\lambda_1$ and $\lambda_2$, with the mid-point grounded so as to provide an equal positive and negative voltage with respect to ground. In the circuit of Fig. 5 only one voltage is required from each of these potentiometers. These voltages are variously fractionated by potentiometer brushes, of which some are handset while others are continuously adjusted in the tracking operation.

From potentiometer $\beta_1$, the voltage sin (β−α) on conductor 131 is successively fractionated by tap 142 on potentiometer $V_3$ and by tap 143 on potentiometer $V_{\beta 5}$ to derive a voltage $VV_\beta$ sin (β−α). Taps 142 and 143 are set by hand and by tracking, respectively. Equation 14 includes the term $$VV_\beta \sin(\beta-\alpha)\left(t_f+\frac{t_d}{4}\right)$$

The fraction $VV_\beta \sin(\beta-\alpha)t_f$ is derived by tap 144 from potentiometer $t_{f3}$, while tap 145 on potentiometer $$\frac{t_d}{4}$$

derives the fraction $$VV_\beta \sin(\beta-\alpha)\frac{t_d}{4}$$

In these fractions $t_f$ is the time of torpedo fall, obtained from empirical tables for the known height of the plane. The fraction $$\frac{t_d}{4}$$

is one-fourth the deceleration time of the torpedo in water, from the plane speed (resultant of V and S) to the torpedo's terminal water velocity v; it is likewise obtained from tables. Each of taps 144 and 145 is handset to a fixed setting.

Thus, the two voltage fractions last enumerated are provided on conductors 151 and 152, respectively and through input resistors form two input voltages to grid a of amplifier 160. To the same grid is similarly supplied the voltage $RV_\beta$ sin (δ−β) via conductor 138 from potentiometer $\beta_2$.

The voltage −sin (δ−λ) on conductor 109 is successively fractionated by handset tap 146 on potentiometer $v_1$, proportionally to the terminal velocity of the torpedo, and proportionally to target range by tap 147 (continuously set in tracking) on potentiometer $R_1$, providing on conductor 153 the voltage $-Rv \sin(\delta-\lambda)$ which is another input to grid a of amplifier 160.

Two more input voltages to grid a are required. These are the voltage $Vvt_f \sin(\alpha-\lambda)$ on conductor 154 and $$SV_\beta\left(t_f+\frac{t_d}{2}\right)\sin(\beta-\lambda)$$

on conductor 172. The first voltage is obtained from successive fractionations of the voltage sin (α−λ) on conductor 101, which fractionations are respectively proportional to V (potentiometer $V_4$, tap 162), to v (potentiometer $v_2$, tap 163) and to $t_f$ (potentiometer $t_{f1}$, tap 164). All of taps 162, 163 and 164 are set by hand to fixed settings. The second voltage is one of a pair obtained by fractionating the voltage sin (β−λ) of conductor 103, first proportionally to $V_\beta$ (potentiometer $V_{\beta 4}$, tap 165), then simultaneously proportionally to $$\frac{t_d}{2} \text{ (potentiometer } \frac{t_d}{2}, \text{ tap 166)}$$

and to $t_f$ (potentiometer $t_{f2}$, tap 167). The fractional voltages thus simultaneously derived are summed by amplifier 170, similar to amplifiers 140 and 150. The output of amplifier 170 comprises the parallel connection of potentiometers $S_3$ and $v_3$ on which respectively handset tap 171 provides on conductor 172 the voltage $$SV_\beta\left(t_f+\frac{t_d}{2}\right)\sin(\beta-\lambda)$$

and tap 173 provides on conductor 174 the voltage $$V_\beta v\left(t_f+\frac{t_d}{2}\right)\sin(\beta-\lambda)$$

The voltage on conductor 172 joins the voltages on conductors 138, 151, 152, 153 and 154 (each through an input resistor) on grid a of amplifier 160. The voltage on conductor 174 is taken through an input resistor to grid b of amplifier 160. The output voltage of this amplifier is, numerically, the sum of the voltages on grid a less the voltage on grid b, and thus electrically represents the left-hand member of Equation 14, omitting the last term thereof.

It will be recalled in describing Figs. 3, 4 and 5 a solution of the attack problem was assumed at hand. The quantities assumed, which in actual practice must be obtained in tracking, are the target range R and speed $V_\beta$, together with the angles δ and β (target bearing and course, respectively). Independently of the tracking operation are known (or observed) the quantities V, S, α and λ and the torpedo ballistic quantities $t_f$, $t_d$ and v. Settings of α and λ have been explained in describing Fig. 3. Later, for completeness, reference will be made to Figs. 9-A to 9-E, inclusive, wherein are illustrated the hand settings which may be made before target tracking is actually begun. Amplifiers 140, 150, 160 and 170 are all of well-known design described in connection with Figs. 7-A and 7-B.

It will be understood that the circuits of Figs. 4 and 5 show one of numerous possible arrangements for the solution of Equations 1, 2 and 14. Other arrangements than that here described will be readily contrived by those skilled in the art.

*Motor speed control*

Each of the motors 29, 81 and 91 is a servomotor, as are other motors later to be enumerated. Their servo character will be apparent from the description of Fig. 6. Battery 175 is shunted by potentiometer 176 from which a desired fraction of the battery voltage is selected by tap 177. Across the selected portion of potentiometer 176 are connected resistor 178 and condenser 179 in series. The voltage across condenser 179 is applied to the input circuit of amplifier 180 (a direct current amplifier of conventional design) by conductors 168 and 169, the former being grounded as shown. The output circuit of amplifier 180 supplies current to control motor M. With the polarity of battery 175 shown in Fig. 6, condenser 179 is charged positively on its upper plate and motor M turns the shaft 181 in a sense dependent on the polarity of output terminals 182 of amplifier 180, say in the sense of the arrow. The variable fractional voltage from battery 175, across condenser 179, symbolically represents the varying unidirectional voltage of rectifier 22, Fig. 3. Such a varying voltage may be supplemented by an arbitrary direct-current voltage, as in Figs. 10 to 14, inclusive, for initial positioning of the corresponding motor shaft.

Shaft 181 carries with suitable insulation an arm bearing condenser 183 and resistance 184 in series. As shaft 181 rotates, contact points represented by the arrows terminating the arm turn in a circle on which at the ends of two mutually perpendicular diameters are contact terminals 1, 2, 3 and 3'. The arrows make contact alternately with terminals 1 and 3' and with terminals 2 and 3. Terminals 3 and 3' are both grounded, terminal 2 is connected to the junction of resistor 178 and condenser 179, while terminal 1 is connected to tap 185 on potentiometer 186 which shunts battery 187. It will be noted that batteries 175 and 187 are grounded at their negative and positive terminals respectively, wherefore condenser 183 in the position shown is so charged that when its contact point reaches terminal 2, a charge is delivered to condenser 179 opposite in sign to the charge thereon received from battery 175.

The capacity of condenser 183 is chosen small compared to that of condenser 179. The amplifier 180 is designed to be capable of driving motor M and its load at the highest required speed when its input voltage, which appears across condenser 179, is a negligible fraction of the input voltage on tap 185 or 177. Resistance 178 is chosen to have a value high enough so that the current flowing through it into condenser 179 will be equal to the average current discharged into condenser 179 from condenser 183 at the highest speed and highest voltage position of tap 185. The polarities of the two voltage sources and the direction of rotation of the motor M are so arranged that these two currents delivered to condenser 179 tend to cancel out. Under these conditions motor M will be driven at a speed and in a direction which will make the output current from contact 2 just equal and opposite to that passing through resistance 178 and the potential of contact 2 will never depart sensibly from ground potential which insures that the discharge of condenser 183 will be sensibly complete. It will be obvious from the figure that twice in each rotation of shaft 181 a small charge is transferred from battery 187 by condenser 183 to neutralize the charge on condenser 179. It is clear that the final rotational speed of shaft 181 is attained when the charging current from battery 175 into condenser 179 is exactly cancelled by the discharging current provided by the repetitive discharges of condenser 183. The time constant of condenser 183 and resistor 184 is made small enough to permit substantially complete charging and discharging of condenser 183 as it passes the respectively appropriate contact terminals at the highest speed expected from motor M.

For a given voltage from tap 185, the speed of shaft 181 is directly proportional to the voltage from tap 177 and inversely proportional to the voltage from tap 185, for the reason that the charging and discharging currents flowing into condenser 179 are respectively proportional to the voltage from tap 177 and to the product of shaft speed by the voltage from tap 185. The driving voltage amplified by amplifier 180 is then just enough to overcome friction losses in the load (not shown) of shaft 181 and the pulsating current provided by the rotation of the arm bearing condenser 183 and resistor 184 is the reverse feedback opposing the current flowing into condenser 179 from battery 175.

Each of motors 29, 81 and 91 is geared down as shown in Fig. 3 in such ratio that a high rotational speed of the motor shaft may produce a conveniently low angular velocity for the potentiometer cards and for the brushes thereon sweeping. Other motors drive through similar gearing shafts to represent the quantities R and $V_\beta$, shown in later figures, and are similarly controlled in speed.

The circuit of Fig. 6 is not itself a part of the present invention, being disclosed and claimed in United States Patent 2,455,247, November 30, 1948 to R. H. Griest.

*Amplifiers*

Figure 7B:
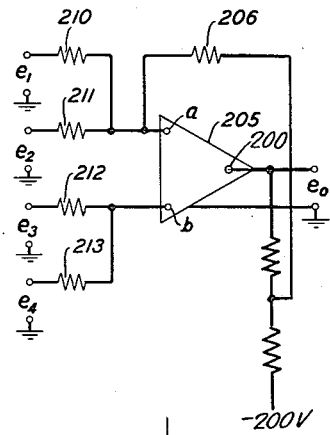

In Figs. 7–A and 7–B are illustrated the general types of circuits used in summing amplifiers 140, 150 and 180 (Fig. 7–A) and in differencing amplifier 160 (Fig. 7–B). These are well-known circuits not themselves a part of the present invention.

Fig. 7–A is a schematic diagram of the fundamental two-stage direct current amplifier used in numerous places in the system of the invention. In the first stage tube 188, suitably a 6SU7GTY, is a double triode with common cathode 189. The first section of tube 188 comprises cathode 189, grid $a$ and anode 190, the second section comprises cathode 189, grid $b$ and anode 191. From a source of constant voltage, not shown, anode 190 is supplied with a positive potential of 100 volts, and 200 volts positive potential is supplied through resistor 192 to anode 191. Cathode 189 is connected through resistor 193 to a negative potential of 200 volts. Tube 195 of the second stage may be a double triode or, as shown in Fig. 7–A, a pentode such as the 6AG7. Of such a pentode, cathode 196 is connected directly to suppressor grid 197 and to +100 volts. Screen grid 198 is supplied with 200 volts positive while anode 200 is supplied through resistor 201 from +360 volts. Control grid 202 is connected through resistor 203 to anode 191 of tube 188 and through resistor 203' shunted by condenser 204 to +200 volts. Between anode 200 and ground is taken the output voltage $e_0$ resulting from the voltage $e_a$ or $e_b$, or both, on grids $a$ or $b$, or both, of tube 188. With no voltages on grids $a$ and $b$, the same anode current flows in both sections of tube 188 since the voltage drop across resistor 192 results in a potential of about 100 volts at anode 191, nearly the same as at anode 190. The combined anode currents, each about 0.2 milliampere, flow through the common cathode resistor 193 producing thereacross a voltage drop of about 200 volts fixing cathode 189 at nearly ground potential. In use, grids $a$ and $b$ are each held at ground potential so that cathode 189 assumes a low positive biasing potential.

In the second stage, cathode 196 has a potential 100 volts positive and slightly higher than that of anode 191 to which grid 202 is connected through resistor 203. Grid 202 is thus appropriately biased negative with respect to cathode 196. With the circuit shown tube 195 passes current such that the voltage at anode 200 remains, with no voltage on grids $a$ and $b$, about 200 volts positive to ground, a voltage considered reference level for the amplifier of Fig. 7–A.

Considering the first section of tube 188 as a cathode follower, it is seen that a voltage applied to grid $a$ appears at cathode 189 with the same sign and nearly the same value. With no voltage on grid $b$ the grid-cathode voltage on the second section of tube 188 will change in accordance with the potential of cathode 189 and this change will be amplified to appear as a voltage at anode 191 of the same sign as the voltage applied to grid $a$. On the other hand, with no voltage on grid $a$ but with a change in potential of grid $b$, the amplified voltage change at anode 191 will be of opposite sign to the change on grid $b$. Thus, for equal voltages of the same sign applied to grids $a$ and $b$ simultaneously, no voltage change takes place at anode 191. Tube 188 thus enables a signal voltage on grid $b$ to be subtracted from a signal voltage on grid $a$. It may be shown that a given signal on grid $b$ is amplified slightly more than an equal signal on grid $a$ and this effect is compensated by adjustment of the input networks through which signals are applied to the two grids. It may be further shown that the gain of the second section is substantially independent of the signal voltages and that the potential of cathode 189 is stable. Cathode heating power, not shown, is conventional.

With the amplifier circuit of Fig. 7–A, the voltage change at anode 200, $e_0$, is proportional to $e_a - e_b$. If further amplification is required, a third stage is connected to the output circuit of tube 195. The electrical circuit of the invention utilizes in various places the amplifier of Fig. 7–A either with or without a third stage. In later description, grids $a$ and $b$ are referred to as inputs "$a$" and "$b$," respectively.

In Fig. 7–B the two-stage amplifier just described is symbolized by triangle 205 in which the connections to grids $a$ and $b$ and to anode 200 are indicated. Negative feedback resistor 206 is connected between grid $a$ and the point of ground potential in a voltage dividing resistance circuit connected between anode 200 and —200 volts. A pair of signal voltages $e_1$ and $e_2$ are connected through individual resistors 210 and 211, respectively, to grid $a$. Signal voltages $e_3$ and $e_4$ are similarly connected through resistors 212 and 213 to grid $b$. As is well known to the art, a large amplification factor for amplifier 205 with a large negative feedback through the high resistance of resistor 206 results in reducing to a very small value the input impedance of amplifier 205. As above stated amplifier 205 may be of two or three stages as required.

The low input impedance brings it about that currents in the input circuit of amplifier 205 are substantially determined only by the resistances of resistors 210 to 213, for given input signal voltages. If these resistances are equal, the input current between grid $a$ and ground is proportional to $e_1+e_2$, that between grid $b$ and ground to $e_3+e_4$. The input voltages to amplifier 205 across this low and stable input impedance are thus likewise proportional to $e_1+e_2$ and to $e_3+e_4$, respectively, and the amplified output voltage $e_0$ is proportional to $(e_1+e_2)-(e_3+e_4)$. Obviously, the resistances of resistors 210 to 213 may be so chosen as to fractionate as desired one or more of the input voltages. The factor of proportionality between output voltage and input voltage is given by $$e_0 = e_1 \frac{R206}{R210}, \text{ etc.}$$

*Ratio of position and rate corrections*

It has been previously mentioned that in making a position correction in either computed range or computed bearing of the target there should be made at the same time a correction in the computed rate of change of range or of bearing: $\Delta \dot{R} = K_1 \Delta R$, $\Delta \dot{\delta} = K_2 \Delta \delta$, numerically in each case. When computed range is increasingly too small, R must be increased and $-\dot{R}$ diminished; tha is, when the range is increased, its rate of decrease must be made less. On the other hand, if the computed bearing is increasingly too small, counted counterclockwise in Fig. 1, it must be increased while at the same time its rate of increase is made greater. The quantities in Equations 1 and 2 which may be varied to bring about such corrections are $V_\beta$ and $\beta$, the target speed and course, respectively, initially hand adjusted to approximate values.

Motors 81 and 91, of which the shaft positions indicate respectively $\delta$ and $\beta$, together with motors later mentioned for driving the shafts to indicate R and $V_\beta$, are individually controlled in speed by apparatus such as is illustrated in Fig. 6, suitable voltage sources taking the places of batteries 175 and 187. It will be convenient to refer to condenser 183 of Fig. 6 as a "commutating condenser" and to designate as a "commutator" the terminals 1, 2, 3 and 3' and condenser 183 in series with resistance 184 sweeping over these terminals. Where in later figures amplifiers such as 180 appear, they are conveniently designated 180R, 180B, etc.

For the R shaft motor, the control voltage applied across the terminals 1 and 3 of the R commutator is constant and chosen of appropriate value, while for the $\delta$ shaft motor the corresponding voltage varies directly with R. As previously explained, the tracking operation includes the progressive correction of assumed values of $V_\beta$ and $\beta$, and for the commutators on the motor shafts indicating these quantities there is provided a control voltage automatically increasing with time in a specific fashion. A suitable constant fraction of this increasing voltage is applied to the $V_\beta$ commutator, while the fraction applied to the $\beta$ commutator varies directly with $V_\beta$.

In connection with Fig. 6 it was pointed out that the speed of the shaft of motor M is inversely proportional to the voltage from battery 187 applied across terminals 1 and 3. The $\delta$ shaft motor is primarily driven by a voltage proportional to $R\dot{\delta}$, Equation 2, so that with a control voltage proportional to R the $\delta$ shaft rotates at a speed proportional to $\dot{\delta}$. Likewise the speed of the $\beta$ shaft, if that shaft is in motion, is inversely proportional to the product of the increasing control voltage multiplied by $V_\beta$; the latter factor is introduced for a reason later to be stated.

Figure 8A:
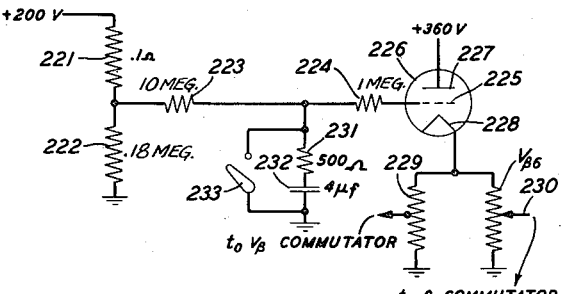
Figs. 8A and 8B are, respectively, a circuit diagram showing means for deriving a particular control voltage and a graph of the time variation of this voltage.
Figure 8B:
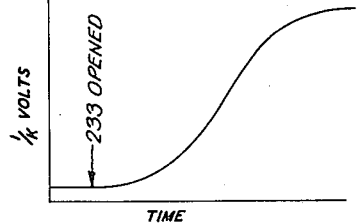
Figure 9A:
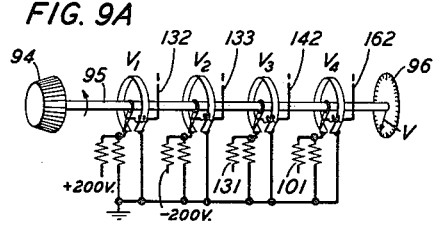
Figs. 9A through 9E show the representation, as resistances selected by handset potentiometer brushes, of the constant quantities involved in the tracking and steering computations.
Figure 9B:
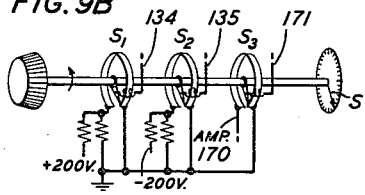
Figure 9C:
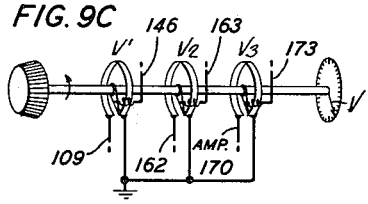
Figure 9D:
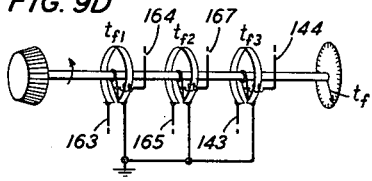
Figure 9E:
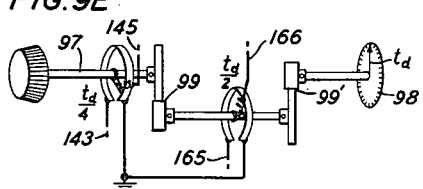

It has been concluded from an analysis not necessary here to reproduce that the most appropriate time variation of the factor K is the reciprocal of the voltage-time curve of Fig. 8-B. A voltage so varying, applied to terminals 1 and 3 of the commutators controlling the motions of the $\beta$ and $V_\beta$ shafts, provides for those shafts speeds inversely proportional to the value of the varying voltage at the moment of its application. The ordinates of the curve of Fig. 8-B are thus appropriately labeled 1/K volts and the time required for the 1/K voltage to reach the final value is chosen to be 90 seconds, more or less. This is an interval related to the presumptive initial errors in target speed and rate of change of bearing, taking into consideration the resolving power (in range and bearing) of the radar system and the ultimate tracking errors considered allowable. The analysis referred to above showed that a constant value of K required tracking corrections over a much longer time to attain satisfactory following of the target.

The circuit shown in Fig. 8-A provides the required voltage according to the curve of Fig. 8-B.

In Fig. 8-A, 200 volts positive to ground is applied over the voltage divider consisting of resistors 221 and 222, whereby about 130 volts is supplied, through resistors 223 and 224 in series, to grid 225 of vacuum triode 226. Of tube 226, anode 227 is connected to 360 volts positive, while cathode 228 is grounded through potentiometers 229 and 230 in parallel. Between ground and the junction of resistors 223 and 224 are connected resistor 231 and condenser 232 in series; these may be shorted by closing switch 233. The operation of the circuit is as follows:

With switch 233 closed, tube 226 is slightly conducting and a small voltage appears between cathode and ground. A suitable constant fraction of this voltage is taken from potentiometer 229 to control the $V_\beta$ commutator, while a fraction proportional to $V_\beta$ controls the $\beta$ commutator. The $\beta$ shaft is shown in Fig. 3, while the $V_\beta$ shaft with which potentiometer 230 is associated will be described in connection with Fig. 13. When tracking corrections are to be started, switch 233 is opened; condenser 232 slowly charges, increasing progressively the conductance of tube 226 and therewith the voltage at cathode 228 in accordance with the curve of Fig. 8-B. Whenever a correction in target speed or rate of change of bearing is made, such a rate correction is related to the simultaneous position correction by the factor $K_1$ or $K_2$, as the case may be, and the value of K is proportional to the reciprocal of the voltage at that instant at cathode 228. Appropriate values of the elements of the circuit of Fig. 8-A are shown in the figure.

The quantities of V, S, $v$, $t_f$ and $t_d$ are individually set by hand and read on dials as illustrated in Figs. 9-A to 9-E, inclusive. Each figure shows a hand-operated knob for the setting of a shaft whereby brushes are positioned on potentiometers to which are applied various voltages, derived from the sources shown in Figs. 3, 4 and 5, namely, battery 78 giving suitably 400 volts with the mid-point at ground potential, and the various trigonometric fractions of this voltage. In each of Figs. 9-A to 9-E, the voltage supplies to the potentiometers concerned are identified by reference numerals shown in Figs. 3, 4 and 5; likewise identified are the potentiometer brushes.

Each handset shaft is set to show on a dial the quantity V, S, $v$, $t_f$ or $t_d$ as the case may be and the brushes turning with each shaft provide corresponding fractions of these voltages. For example, in Fig. 9-A knob 94 sets shaft 95 in an angular position to read on dial 96 the wind velocity V. Brushes on potentiometers $V_1$, $V_2$, $V_3$ and $V_4$ select respectively V fractions of the voltages +200, -200 and the voltages sin $(\beta-\alpha)$ and sin $(\alpha-\lambda)$ for the circuit of Fig. 5.

A like description may be given of the other handset shafts. Only V and S of Figs. 9-A and 9-B are involved in the circuits of both Figs. 4 and 5; $v$, $t_f$ and $t_d$ are involved only in the circuit of Fig. 5. It will be noted that shaft 97 turns the brush of potentiometer $t_d$ through one-half this reading, there being interposed 2:1 step-up gears 99 and 99' between $$\frac{td}{4} \text{ and } \frac{td}{2}$$

and between the latter and dial 98, respectively.

*Target vector corrections*

It was earlier stated that $$K=\frac{\Delta \dot{R}}{\Delta R}$$

for the ratio of simultaneous position and range rate corrections, with a similar expression for the correction of the computed bearing. K need not be the same in each case, and we may write $$K_1=\frac{\Delta \dot{R}}{\Delta R}, \ K_2=\frac{\Delta \dot{\delta}}{\Delta \delta}$$

numerically in each case. It is apparent from inspection of Fig. 1 that if the computed range is continuously too great, the computed speed in the line of sight is too small, wherefore a negative $\Delta R$ is properly accompanied by a positive $\Delta \dot{R}$, so that in Equation 1 the lefthand member shall become $-(R+\Delta \dot{R})$. On the other hand, if the computed $\delta$ is continuously too small (target echo spot showing left of the central vertical line on the oscilloscope screen) the computed $\dot{\delta}$ is too small, and a positive $\Delta \dot{\delta}$ must accompany a positive $\Delta \delta$. That is to say $K_1$ is negative and $K_2$ positive.

Differentiating Equations 1 and 2 in $\dot{R}$, $\dot{\delta}$, $V_\beta$ and $\beta$, keeping constant V, S, $\alpha$, $\delta$ and $\lambda$, we obtain the relation between $\Delta R$ or $\Delta \delta$ on the one hand to the corrections in target course and speed, $\Delta \beta$ or $\Delta V_\beta$, respectively, which the operator must effect in bringing the target echo spot back to the intersection of lines AL and RL. There result Equations 15 and 16:

$$V_\beta \Delta\beta = K_1 \sin (\delta-\beta) \ \Delta R + RK_2 \cos (\delta-\beta) \ \Delta \delta$$
(15)

$$\Delta V_\beta = K_1 \cos (\delta-\beta) \ \Delta R - RK_2 \sin (\delta-\beta) \ \Delta \delta$$
(16)

Equations 15 and 16 state the target correction as two velocity components: $V_\beta \Delta \beta$, at right angles to the assumed target course, which corrects $\beta$; $\Delta V_\beta$, along the assumed course, which corrects $V_\beta$.

When switch 233, Fig. 8-A, is opened, a value of K is established which varies with time in a way exempt from manual control. At any instant after opening switch 233, the operator makes tracking corrections with the K corresponding to that instant.

*Computation of speed components*

Fig. 10 shows diagrammatically the apparatus for computing target range. Motor 241 drives range shaft 242 through gears 243 and 244 and is controlled in speed by a commutator such as is shown controlling motor M in Fig. 6. Amplifier 140 of Fig. 4 provides the computed range rate $-\dot{R}$ and takes the place of battery 175, potentiometer 176 and tap 177 of Fig. 6. In Fig. 10, the elements repeated from Fig. 6 are designated by the same numerals as in the latter figure. Battery 187 here provides a scale factor and computed range R is read on dial 245. Manual intervention to control the speed and angular position of shaft 242 is possible by operating switch 246 to connect to condenser 179 the desired polarity from a correcting voltage source here symbolized by battery 247.

Shaft 242 carries, with suitable insulation, four brushes traversing potentiometers $R_1$, $R_2$, $R_3$ and $R_4$, respectively. From these brushes conductors 153, 128, 249 and 50 furnish R fractions of the voltages connected across their respective potentiometers. Each of these potentiometers is a circular card with linear winding. Potentiometer $R_1$ is shown also in Fig. 5. Across it is supplied via conductor 109 (Fig. 3) and tap 146 (Fig. 5), the voltage $-v \sin(\delta-\lambda)$. Conductor 153 then supplies the R fraction of this voltage to amplifier 160 of Fig. 5.

Potentiometer $R_2$, shown also in Fig. 5, is supplied via conductor 121 (Fig. 3) with the voltage $\sin(\delta-\beta)$, and its brush (tap 128 of Fig. 5) supplies to potentiometer $V_{\beta 1}$ the voltage $R \sin(\delta-\beta)$ as another input to amplifier 160.

Battery 248, of convenient voltage, is connected across potentiometer $R_3$ from which conductor 249 provides a range voltage to control the speed of motor 81 of Fig. 3; this voltage is connected across terminals 1 and 3 of the "commutator" controlling motor 81, as shown later in Fig. 11.

Potentiometer $R_4$, across which is connected battery 250 similar to battery 248, provides from its brush a range voltage on conductor 50 which is utilized in the target observing system of Fig. 2.

Fig. 11 is a diagram of the control circuit of motor 81, Fig. 3, which is similar in principle to the circuit controlling motor 241 of Fig. 10. Amplifier 150 of Fig. 4, the inputs to which have already been described, provides an output voltage representative of the transverse component $R\dot{\delta}$ of the plane speed relative to the target. Here the places of battery 187 and potentiometer 186 of Fig. 6 are taken by battery 248 and potentiometer $R_3$ of Fig. 10. Conductor 249 applies to terminal 1 of the $\delta$ "commutator" a voltage proportional to computed target range so that as before explained the angular speed of shaft 83 is proportional to $R\dot{\delta}$ divided by R, that is, to $\dot{\delta}$ itself. The potentiometers and brushes associated with shaft 83 have been described in connection with Fig. 3. In Fig. 11 there are shown battery 251 and switch 252 whereby manual connection is possible of the initial angular position and speed of shaft 83. As in Fig. 10, the elements of the "commutator" are designated by the same numerals, wherever appropriate, as in Fig. 6.

The cooperation of the motion of shaft 242, Fig. 10, with the range observing portion of Fig. 2 is understood when it is recalled that the voltage from conductor 50, Fig. 10 is decreasing at a controlled rate and is supplied to range sweep generator 37 of Fig. 2. Here the voltage on conductor 50 is equalled, once in each interval between the radar emissions, by the sweep voltage which rises uniformly with time recurrently starting from a minimum value at each instant of pulse emission. The voltage impulse which occurs at this moment of equality brightens, as earlier described, the cathode ray trace and such brightening appears as horizontal line RL on screen 23, Fig. 2. In the back and forth horizontal sweep of antenna 10 the individual brightenings are distributed across the screen and fuse visually into line RL.

The vertical position on screen 23 of line RL depends on the interval between radar pulse emission and the occurrence of the brightening pulse and this occurrence may be made to coincide with the reception of the target echo. By manual control through switch 246, Fig. 10, the operator adds to or subtracts from the angular position of shaft 242 to bring echo spot 12 initially to be intersected by line RL. Thereafter, the angular speed of shaft 242 may be too great or too small to cause the voltage on conductor 50 to decrease in exact proportion to target range, and line RL fails properly to follow the echo spot in vertical position.

Battery 187 and tap 185 in Fig. 10 symbolize the means for deriving a rate correcting voltage as later described in connection with Fig. 14. Such correction voltage may be chosen to adjust the angular speed of shaft 242 to preserve the intersection of spot 12 by line RL.

Similarly, from brush 112 on potentiometer $\delta_4$ of Fig. 3 conductor 57 supplies the voltage $-(\delta-\lambda)$ as one input to antenna azimuth amplifier 56, Fig. 2. This voltage there opposes the input from conductor 60, the voltage on which represents the antenna facing and equality of these voltages at the center of the antenna sector corresponds to this center's being directed toward the target. The initial position and the subsequent rate of shaft 83 are controlled as are those of shaft 242. When this control is satisfactory, azimuth line AL intersects continuously echo spot 12.

Where computed position only in range and bearing is to be corrected, only the R and $\delta$ shafts, 242 and 83, respectively, need to be adjusted. Where rate corrections only are required, adjustments are made of $\beta$ shaft 93 and of the $V_\beta$ shaft presently to be described.

It will be recalled that $\alpha$ shaft 67 in Fig. 3 is initially set in accordance with the known wind direction, and that $\lambda$ shaft 31 is controlled from the gyro.

Fig. 12 is a diagram of the circuit controlling motor 91 of Fig. 3, driving shaft 93 to an angular position representing the target course referred to the gyro axis. In this case, the controls for correcting the initial assumed value of $\beta$ are contributed by two voltage sources, symbolized by batteries 253 and 254 with switches 255 and 256, respectively. These voltage sources are concerned respectively with azimuth and range corrections such as indicated in Equations 15 and 16. Another difference from the circuit of Fig. 11 is that the control source 248 of Fig. 11 is replaced in Fig. 12 by a suitable fraction of the voltage $$\frac{1}{K}$$

at cathode 228 of tube 226, specifically the voltage $$\frac{1}{K_1} V_\beta$$

from a tap on potentiometer 230, of Fig. 8-A. Potentiometers and brushes associated with shaft 93 are shown in Fig. 3 and are described in connection therewith.

Figure 13:
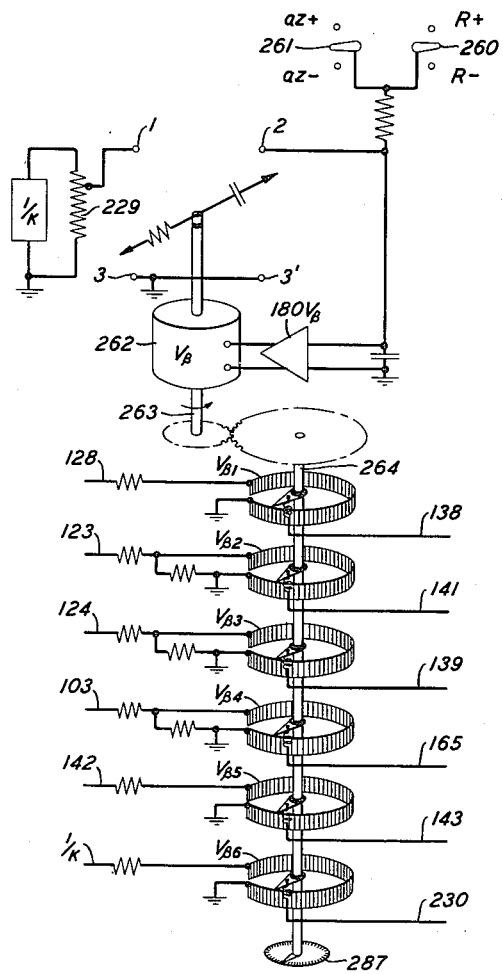
Fig. 13 is a schematic diagram of a target speed servo system.

Referring now to Fig. 13, the initially assumed target velocity is set by operating keys 260, 261 to control the motion of $V_\beta$ motor 262. Voltage sources representing azimuth and range, either of which may be positively or negatively corrected, are understood to be selectively applied by manipulating key 260 or key 261. Shaft 263 of motor 262 drives through suitable gearing shaft 264 on which are carried with proper insulation six brushes traversing individually the linear potentiometers $V_{\beta 1}$ to $V_{\beta 6}$. Each brush provides a target speed fraction of the voltage across the corresponding potentiometer and these voltages are enumerated in the table below:

| Voltage Input | On Conductor | To Potentiometer— | Voltage Output | Via Conductor | Supplied to— | Figure |
|---|---|---|---|---|---|---|
| $R \sin(\delta - \beta)$ | 128 | $V_{\beta 1}$ | $RV_\beta \sin(\delta - \beta)$ | 138 | $\sigma$ amp. 160 | 5 |
| $-\sin(\delta - \beta)$ | 123 | $V_{\beta 2}$ | $-V_\beta \sin(\delta - \beta)$ | 141 | $R\dot\delta$ amp. 150 | 4 |
| $-\cos(\delta - \beta)$ | 124 | $V_{\beta 3}$ | $-V_\beta \cos(\delta - \beta)$ | 139 | $\dot R$ amp. 140 | 4 |
| $\sin(\beta - \lambda)$ | 103 | $V_{\beta 4}$ | $V_\beta \sin(\beta - \lambda)$ | 165 | $\frac{t_d}{2}, t_{f2}$ pots. | 5 |
| $V \sin(\beta - \alpha)$ | 142 | $V_{\beta 5}$ | $VV_\beta \sin(\beta - \alpha)$ | 143 | $\frac{t_d}{4}, t_{f3}$ pots. | 5 |
| $\frac{1}{K}\begin{pmatrix}\text{Cathode 228,}\\ \text{Fig. 8-A}\end{pmatrix}$ | | $V_{\beta 6} \frac{1}{K} V_\beta$ | | 230 | $\begin{pmatrix}\text{Terminal 1,}\\ \beta \text{ comm.}\end{pmatrix}$ | 12 |

Shaft 264 terminates in a pointer which indicates target speed on dial 287.

The angular speed of shaft 264 is regulated to be proportional to K by the connection to a fixed tap on potentiometer 229, shown in Fig. 8-A as one of two potentiometers connecting cathode 228 to ground. Potentiometer $V_{\beta 6}$ of Fig. 13 is the other potentiometer so identified in Fig. 8-A on which a brush with conductor 230 is indicated as supplying terminal 1 of the $\beta$ commutator shown in Fig. 12.

The $V_\beta$ commutator of Fig. 13, is like those previously described in connection with Figs. 6, 10, 11 and 12. In Fig. 13 it is therefore sufficient to identify by numerals only the commutator terminals 1, 2, 3 and 3'.

Both $V_\beta$ and $\beta$, being constant for a uniformly moving target, are initially assumed in operating control keys 260, 261 for $V_\beta$, keys 255, 256 for $\beta$. It will be understood that the voltage sources applied by these keys are only symbolically indicated in Figs. 12 and 13; the actual circuit for setting and later correcting the assumed target speed and course is shown in Fig. 14.

Shafts 93, Fig. 12, and 263, Fig. 13 are in motion only when the tracking operator imposes the assumption, or the corrections thereof, concerning the target. When tracking is satisfactory, neither of these shafts further moves. It is obvious, however, that a change in target motion can be accommodated, whether gradual or abrupt.

It will be apparent from the description of Figs. 4, 5 and 10 to 13, inclusive, that the components of the plane speed relative to the target are represented at the outputs of amplifiers 140 and 150, solving Equations 1 and 2, respectively, in Fig. 4 while meter 161 in Fig. 5 reads other than zero if the plane heading $\lambda$ is not that conforming to Equation 14. Whatever $\lambda$ is, Equations 1 and 2 reciprocally determine target range R and target bearing $\delta$, provided $V_\beta$ and $\beta$ are correctly given, and this correctness is shown by the target echo spot continuing at the intersection of lines AL and RL. We note that $\lambda$ must satisfy Equation 14 only if the target is to be struck by a torpedo dropped from the plane. If only target course and speed are to be determined and read on dials 87, Fig. 3, and 287, Fig. 13, the plane heading may be whatever is convenient.

Moreover, if the target is stationary, the apparatus of the invention determines a relative speed and course. The speed so determined is then the actual ground speed of the plane, and the measured course reversed is the ground course flown. This ground course may be compared with the heading $\lambda$ to determine the angle of drift; the reading on dial 87 compared with that on dial 43, Fig. 3.

For all purposes there are required the initial assumptions of target quantities and their progressive correction in accordance with Equations 15 and 16. Means for such adjustments are now to be described.

Referring now to Fig. 14, motors 241, 91, 262 and 81 are controlled in speed by the output voltages of amplifiers 140, 180$\beta$, 180$V_\beta$ and 150, respectively, as shown in Figs. 10, 12, 13 and 11.

Each motor shaft terminates at one end in a commutating condenser and at the other end in gearing driving brushes over its associated potentiometers. Such gearing is not shown in Fig. 14. Motors 241 and 81 are concerned in setting target range and bearing to make lines AL and RL initially intersect the target echo spot, while motors 262 and 91 set target speed and course.

Under control of summing amplifier 140, motor 241 drives shaft 242 to an R position. Motor 81 drives shaft 83 to a $\delta$ position under control of summing amplifier 150. A commutator such as that shown in Fig. 6 cooperates in the speed control of each of these shafts. As previously explained, battery 187 provides the scale factor of the expression of range, while battery 248 and the brush on potentiometer R3 make the angular speed of shaft 83 proportional to $R\dot\delta/R$.

Motor 91, controlled by the voltage output of amplifier 180$\beta$, receives from that amplifier a voltage representing $V_\beta \Delta\beta$ and the cooperating commutator effectively divides this voltage by $V_\beta/K$ as described in connection with Figs. 12 and 13.

Motor 262 is controlled by the output voltage of amplifier 180$V_\beta$ and the cooperating commutator causes the speed of shaft 264 to be proportional to this output voltage multiplied by K. For convenience, $K_1$ will be considered equal to $K_2$.

Both motors 91 and 262 may be initially energized by positive or negative voltages from source 268 or 269, respectively, to set the assumed target quantities.

Tracking key 270 is operable either left or right (arrow 280) to close simultaneously upper or lower contacts, respectively, of switches 271, 272 and 273. Key 270 is also operable forward or back (arrow 290) to close simultaneously upper or lower contacts, respectively, of switches 274, 275 and 276. The operations in the directions of arrows 280 and 290 are independent and are not simultaneously made.

Potentiometer $\beta_2$ and battery 78 of Fig. 3 are repeated in Fig. 14. The four brushes on potentiometer $\beta_2$ stand at radii defining the angle $(\delta-\beta)$ as indicated in the figure, and the conductors individually connected to these brushes provide fractions of the voltage of battery 78 as follows: 121', sin $(\delta-\beta)$; 122, cos $(\delta-\beta)$; 123, $-\sin$ $(\delta-\beta)$; 124, $-\cos$ $(\delta-\beta)$. Such are the fractional voltages involved in Equations 15 and 16 for tracking correction of $\beta$ and $V_\beta$.

Battery 281, with grounded mid-point, supplies positioning voltage for motors 241 and 81. Resistors 282 and 283, each grounded at its midpoint, enable suitably great fractions of the source voltage to be used, depending on the position of key 300; moving key 300 upward connects conductors 286 and 287, as well as conductors 284 and 285, to the respective maximum positive and negative voltages of source 281, while downward closing of this key connects the conductors named to smaller fractions of the source voltage.

Conductors 286 and 287 supply a range correcting voltage, of sign dependent on the position of switch 276, while conductors 284 and 285 supply a bearing correction voltage of sign dependent on the position of switch 273. The latter correcting voltage is further subdivisible by operating key 310, upward to use the maximum bearing correction voltage, downward to use a fraction thereof. This is understood to be desirable when we recall that a correction required in computed range is independent of the range itself, while a given bearing correction requires the less correction voltage at the greater range. Accordingly, key 310 is operated down for target ranges exceeding 15,000 feet, up for lesser ranges. The positive and negative voltages selected by switch 310 are supplied by conductors 288 and 289 to the lower and upper contacts, respectively, of switch 273. Similarly connected to the contacts of switch 276 are the conductors 286 and 287.

For the situation illustrated in Fig. 1, the target range is decreasing while its bearing to the left of the approaching plane is increasing. Accordingly, amplifiers 140 and 150 furnish output voltages driving, respectively, shaft 242 to decreasing values of R and shaft 83 to increasing values of $\delta$. The polarities of these voltages on the motors they control are understood to be so adjusted that a positive correcting voltage at the input of amplifier 180R increases the computed range and such a voltage to amplifier 180$\delta$ increases the computed bearing.

Correcting voltages from switches 276 and 273 are applicable to the respective amplifiers when switches 320 are closed. In that case a range correcting voltage is applied to amplifier 180R when key 270 is operated along arrow 290, upward to decrease, downward to increase, the computed range, or a bearing correcting voltage is applied to amplifier 180$\delta$ when key 270 is operated along arrow 280, left to decrease, right to increase, the computed bearing. The magnitude of the corrections in range or azimuth is dependent on the closing of switch 300, upward for rapid correction, downward for correction after normal tracking is established. As explained, switch 310 is operated to make a smaller bearing correction at long range.

The procedure at the beginning of target observation is as follows:

Having set in the known or directly observed quantities as described in connection with Figs. 9-A through 9-E and by trial having found the target echo spot somewhere on the oscilloscope screen, estimated target course $\beta$ and speed $V_\beta$ are set by operation of keys 268' and 269'. Then with switch 300 operated upward, switch 310 downward and switches 320 closed, the observer finds range line RL and azimuth line AL at right angles on the screen and each moving relatively to the target echo spot unless it happens that all estimates are correct. If the spot is below the range line, the computed range is too great and key 270 is moved upward to decrease it.

If the spot is to the right of the azimuth line, the computed bearing is too great and key 270 is operated left. Each operation applies through switches 320 a negative correcting voltage to the appropriate motor, the upper contact of switch 276, or of switch 273, being made.

By such operations of key 270, the echo spot is brought to the intersection of the reference lines on the oscilloscope screen. From this intersection the spot will wander unless the time rates of change of R and $\delta$ are correct, and these rates are from Equations 1 and 2 seen to be correctible by readjusting the assumed $\beta$ and $V_\beta$. After the spot has first been located, as just described, if it is observed to wander the operator must bring it back by simultaneous rate and position corrections, the rate corrections in accordance with Equations 15 and 16. To make the rate corrections, switches 330 must also be closed.

The corrections in position, $\Delta R$ for range, $\Delta \delta$ for bearing, are proportional to the length of time the operator holds key 270 operated along arrow 290 for range or arrow 280 for bearing, switches 320 being closed. Switches 330 being closed, as well, switches 271 and 272 apply when key 270 is operated left or right rate correcting voltages to amplifiers 180$\beta$ and 180$V_\beta$, driving shafts 93 and 264, respectively, to new positions corresponding to amended $\beta$ and $V_\beta$, at the same time that the computed bearing $\delta$ is corrected. When key 270 is operated forward or back, switches 320 and 330 being closed, computed range R is corrected and at the same time switches 274 and 275 apply rate correcting voltages to amplifiers 180$\beta$ and 180$V_\beta$, likewise amending the assumed $\beta$ and $V_\beta$, respectively.

Referring to Equations 15 and 16, we see that the correction in range, $\Delta R$ by forward or back operation of key 270, carries with it corrections in $\beta$ and $V_\beta$ corresponding to the first terms of the right-hand members of these equations, while corrections corresponding to the second terms accompany bearing correction $\Delta \delta$ by the operation of key 270 left or right. In each operation of key 270, velocity correction proportional to position correction in range (or in bearing) is made in the assumed target motion.

One of the corrections, $V_\beta \Delta \beta$, is a velocity at right angles to the assumed target course; it is divided by $V_\beta$ by the voltage on tap 230, from potentiometer $V_{\beta 6}$ so that a speed change is imparted to shaft 93, which alters its angular position by an amount $\Delta \beta$ proportional to this speed change multiplied by the time of operation of key 270. That is, $\Delta \beta$ is proportional to $\Delta R$ (or to $\Delta \delta$), the latter being proportional to the voltage applied from switch 276 (or switch 273) times the time of operation of key 270. The factor of proportionality is K sin $(\delta-\beta)$ for the range correction, $$RK \cos (\delta-\beta)$$

for the bearing correction, $K_1$ and $K_2$ being here regarded as equal. The other velocity correction $\Delta V_\beta$ is related in like fashion to $\Delta R$ or to $\Delta \delta$ in accordance with Equation 16.

Potentiometer $\beta_2$, with its associated brushes driven by $\delta$ shaft 83 through gearing including shaft 83', Fig. 3, is shown again in Fig. 14. These brushes are here shown in an illustrative position at the indicated angle $(\delta-\beta)$. From battery 78 sine and cosine fractional voltages, positive and negative, are taken by conductors 121', 122, 123 and 124 to the appropriate contacts of switches 271, 272, 274 and 275.

Voltages connected to the upper switch contacts made by operating key 270 are thus as follows:

| Switch | Voltage |
|---|---|
| 276 | $-\Delta R$ |
| 275 | $-\sin (\delta-\beta)$ |
| 274 | $-\cos (\delta-\beta)$ |
| 271 | $-\cos (\delta-\beta)$ |
| 272 | $+\sin (\delta-\beta)$ |
| 272 | $-\Delta \delta$ |

To the lower contacts are connected, respectively, similar voltages of opposite sign.

The second terms of the right-hand members of Equations 15 and 16 include the factor R as well as the sine or cosine of $(\delta-\beta)$. This factor is allowed for by introducing potentiometers 301 and 302 to ground from the blades of switches 271 and 272, respectively. A rough allowance is enough, and is made by ganging switches 303 and 304 with switch 310, thereby selecting at target ranges greater than 15,000 feet the entire voltages at the corresponding switches 271 and 272 and small fractions thereof at closer range.

It will be understood that the diagram of Fig. 14 is illustrative only of means for making range and rate corrections, or bearing and rate corrections.

After the target spot is first centered, switch 300 is operated downward, with switches 310, 303 and 304 in the position appropriate to the existing target range. Switches 330 are closed. Thereafter, if position corrections only are thought needed, switches 330 are opened. In rate corrections only, switches 320 are opened. All of switches 320 and 330 are normally closed in tracking the target.

To correct the vertical downward wandering of the echo spot on the oscilloscope screen, key 270 is operated upward. This corrects a computed range too great and a too small computed relative speed in the line of sight, without correction of spot horizontal position. Correction voltages now are applied only to amplifiers 180R, 180$\beta$ and 180V$_\beta$ by conductors 311, 312 and 313, respectively. The corrections so made are the following:

| From Switch | Correction | Effect in Fig. 1 |
|---|---|---|
| 276 | $-\Delta R$ | decreases computed range. |
| 275 | $\frac{V_\beta \Delta \beta}{V_\beta} = \frac{-K}{V_\beta} \sin (\delta-\beta) \Delta R$ | rotates target course toward line of sight. |
| 274 | $\Delta V_\beta = -K \cos (\delta-\beta) \Delta R$ | increases target speed (cos $(\delta-\beta)$ is negative). |

Here, $\Delta R$ is proportional to the time key 270 is up. Reference to Fig. 1 shows that the correction amends the assumed target vector by increasing its length and rotating it toward the line of sight, leaving its transverse component unchanged.

To correct horizontal wandering of the spot to the right, key 270 is operated left. This corrects a computed target bearing too great and a too large computed relative target speed at right angles to the line of sight, without correcting the spot's vertical position. Now, correction voltages are applied via conductors 312, 313 and 314, and the corrections are as follows:

| From Switch | Correction | Effect in Fig. 1 |
|---|---|---|
| 273 | $-\Delta \delta$ | decreases computed bearing. |
| 272 | $\Delta V_\beta = RK \sin (\delta-\beta) \Delta \delta$ | increases target speed. |
| 271 | $\frac{V_\beta \Delta \beta}{V_\beta} = -\frac{RK}{V_\beta} \cos (\delta-\beta) \Delta \delta$ | turns target course from line of sight (cos $(\delta-\beta)$ is negative). |

Reference to Fig. 1 will show that this leftward operation of key 270 reduces the computed bearing which left the echo spot to the right of the azimuth line and at the same time amends the target assumptions by increasing the target vector in length and rotating it away from the line of sight, thereby increasing its velocity component toward the right without altering the component in the line of sight. $\Delta R$ and $\Delta \delta$ are proportional to the respective times of operation of key 270.

Each of the above operations of key 270 results in an increase in the assumed target speed. The first operation (upward) rotates the target vector toward the line of sight, while the second operation (left) rotates this vector away from that line. The latter rotation predominates because, for the situation of Fig. 1, too great a transverse relative speed of plane to the right of the line of sight calls for such a net transverse correction. The first operation affects only the vertical, the second operation only the horizontal position of the echo spot.

The angle $(\delta-\beta)$ indicated in Fig. 14 is actually some 180 degrees less than the angle so indicated in Fig. 1, a deviation introduced for the sake of clarity in the showing and description of Fig. 14. The electrical connections to potentiometer $\beta_2$ and the brushes thereon are so drawn that the operation of key 270 shall correctly apply voltage polarities to the motors consistently with the effects required in accordance with Equations 15 and 16. As explained, the R factor in these equations need be only roughly allowed for by switches 303, 304.

The operator continues the corrections of target course and speed until the target echo spot is seen steadily bisected by both lines AL and RL. This may be expected after, at most, some two minutes of tracking, when the target velocity read on dial 287, Fig. 13, and the target course read on dial 87, Fig. 3, will be established accurately enough for the purpose of torpedo attack, say to within one to two feet per second in target vector velocity.

The accuracy of tracking is not impaired by variation in plane heading $\lambda$ if turns are properly banked. During tracking corrections, meter 161, Fig. 5, varies with varying summation of the terms in the left-hand member of Equation 14, and it is the pilot's function so to guide the plane that meter 161 shall read zero at the instant of release. At any point in the plane's course within a maximum range of 10,000 feet after a satisfactory tracking run has been made and meter 161 reads zero, the torpedo may be dropped to strike the target.

It will be recognized that Equations 1 and 2 express, as two rectangular components, the plane velocity with respect to the target. This velocity is the resultant of three vectors which are the velocities of the plane with respect to the air, of the air with respect to earth and of the target with respect to earth. In the case described, it is the third of these vectors which is computed in the tracking operation and the correctness of the computation is tested by observing the adherence of the target echo spot to the intersection of the reference lines on the oscilloscope screen. Obviously, any one of the three vectors may be determined if the other two are known, and such a determination is within the scope of the invention.

What is claimed is:

1. A system of apparatus for tracking an object moving relatively to an observer comprising electrical means for continuously indicating to the observer the relative position of the object in range and bearing, electromechanical means for continuously computing a relative position including means for computing range and bearing and rates of change thereof, means for continuously exhibiting the computed position on the indicating means for comparison with the indicated position, means for correcting the computed range and bearing to effect identity of the computed with the indicated position and means for progressively correcting the computed rates of change of range and bearing to maintain the identity, the last-named means including means for simultaneously correcting the computed range and its rate of change, means for simultaneously correcting the computed bearing and its rate of change and means for automatically varying with time the ratios of the corrections in rates to the corrections respectively simultaneous therewith.

2. A system of apparatus for tracking an object moving relatively to an observer comprising electrical means for continuously indicating to the observer the relative position of the object in range and bearing, electromechanical means for continuously computing a relative position including means for computing range and bearing and rates of change thereof, means for continuously exhibiting the computed position on the indicating means for comparison with the indicated position, means for correcting the computed range and bearing to effect identity of the computed with the indicated position and means for progressively correcting the computed rates of change of range and bearing to maintain the identity, the last-named means including means for simultaneously correcting the computed range and its rate of change, means for simultaneously correcting the computed bearing and its rate of change and means for automatically causing to diminish with time the ratios of the corrections in rates to the corrections respectively simultaneous therewith.

3. In a tracking system including means for continuously indicating in range and bearing the position of a moving object relative to an observer and electromechanical means for continuously computing a provisional position of the object in range and bearing from the observer, said computed range and bearing varying with time each at a provisional rate, means for correcting the provisional rates comprising means for exhibiting on the indicating means the provisional position for comparison with the indicated position, means for controlling the electromechanical means to correct the computed range and bearing to agree with the indicated range and bearing respectively thereby effecting agreement of the provisional with the indicated position and means for progressively correcting each of the provisional rates simultaneously with the correction of the corresponding computed quantity to maintain the agreement, the last-named means including electrical circuit means for causing the ratio of each rate correction to the simultaneously made quantity correction to decrease progressively with time.

4. For a torpedo attack on a moving target in water from an airplane flying at known airspeed $S$ and heading $\lambda$ at known altitude in a wind of known velocity $V$ and direction $a$, a system of apparatus for determining the heading appropriate to launch the torpedo of known ballistics, said ballistics including the time of fall $t_f$ from the known altitude, the terminal water velocity $v$ of the torpedo and the time $t_d$ of deceleration of the torpedo in water to the velocity $v$, comprising means for continuously indicating the heading of the airplane, electrical means for continuously indicating the relative position of the target in range $R$ relative to the airplane and in bearing $\delta$ relative to north, electromechanical means for computing a relative position of the target in like range and bearing including means for indicating an assumed target motion in water of speed $V_\beta$ and course $\beta$ relative to north and means for combining the assumed motion with the known wind, with the airspeed and indicated heading to derive computed rates of change of target range and bearing, means for exhibiting on the electrical indicating means the computed target position for comparison with the indicated target position, means for progressively correcting the assumed target motion in speed and in course to effect and maintain coincidence of the computed and indicated positions, a source of voltage, potentiometric means controlled by the computing means for deriving from the source voltages respectively proportional to $RV_\beta \sin (\delta-\beta)$, $-Rv \sin (\delta-\lambda)$ $$(S-v)\left(t_f+\frac{td}{2}\right)V_\beta \sin (\beta-\lambda), V\left(t_f+\frac{td}{4}\right)V_\beta \sin (\beta-a)$$

and $Vvt_f \sin (a-\lambda)$, means for summing said voltages and means for indicating the sum thereof, which sum becomes zero when the heading $\lambda$ is appropriate.

5. For an observer in motion with known components of speed and direction relative to a fixed reference system, means for determining the independent motion of an observed object relative to the reference system comprising electrical means for continuously indicating the position of the object relative to the observer, electromechanical means for combining functions of the known components of the observer's motion with functions of assumed like components of the object's independent motion to compute continuously a provisional position of the object relative to the observer, means for exhibiting on the indicating means the provisional position for comparison with the indicated position, means for correcting the assumed components to effect and maintain agreement of the provisional and the indicated position and means for indicating the corrected assumed components.

RAYMOND H. GRIEST.
DEAN E. WOOLDRIDGE.

REFERENCES CITED

The following references are of record in the file of this patent:

UNITED STATES PATENTS

| Number | Name | Date |
|---|---|---|
| 2,385,952 | Svoboda | Oct. 2, 1945 |
| 2,402,024 | Crooke | June 11, 1946 |
| 2,407,325 | Parkinson | Sept. 10, 1946 |
| 2,412,585 | Klemperer et al. | Dec. 17, 1946 |
| 2,414,819 | Lakatos | Jan. 28, 1947 |
| 2,420,016 | Sanders | May 6, 1947 |
| 2,427,463 | Klemperer et al. | Sept. 16, 1947 |